US010824421B2

(12) United States Patent
Wright et al.

(10) Patent No.: US 10,824,421 B2
(45) Date of Patent: Nov. 3, 2020

(54) COMPUTING ELAPSED CODING TIME

(71) Applicant: Microsoft Technology Licensing, LLC, Redmond, WA (US)

(72) Inventors: Ian Paul Wright, Oxford (GB); Albert Ziegler, Oxford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/408,946

(22) Filed: May 10, 2019

(65) Prior Publication Data

US 2020/0225944 A1     Jul. 16, 2020

Related U.S. Application Data

(60) Provisional application No. 62/669,596, filed on May 10, 2018.

(51) Int. Cl.
| | |
|---|---|
| *G06F 8/77* | (2018.01) |
| *G06Q 10/06* | (2012.01) |
| *G06N 3/08* | (2006.01) |
| *G06F 8/71* | (2018.01) |
| *G06Q 10/04* | (2012.01) |

(52) U.S. Cl.
CPC .............. *G06F 8/77* (2013.01); *G06F 8/71* (2013.01); *G06N 3/084* (2013.01); *G06Q 10/04* (2013.01); *G06Q 10/06313* (2013.01); *G06Q 10/06315* (2013.01)

(58) Field of Classification Search
CPC .. G06F 8/71; G06F 8/77; G06Q 10/04; G06Q 10/06313; G06Q 10/06315
USPC ........................................................ 717/101
See application file for complete search history.

(56) References Cited

U.S. PATENT DOCUMENTS

| | | | |
|---|---|---|---|
| 7,974,849 B1 * | 7/2011 | Begole ............... | G06Q 10/0631 705/1.1 |
| 8,595,685 B2 | 11/2013 | Sharma et al. | |
| 9,208,056 B1 * | 12/2015 | Henriksen ........... | G06F 11/3616 |
| 9,311,056 B2 | 4/2016 | Armstrong et al. | |
| 10,303,469 B1 | 5/2019 | Neatherway et al. | |
| 10,310,968 B2 | 6/2019 | Biddle et al. | |
| 2016/0350692 A1 | 12/2016 | Doganata et al. | |
| 2018/0121174 A1 | 5/2018 | Phillips et al. | |
| 2018/0300127 A1 * | 10/2018 | Wright ..................... | G06F 8/77 |
| 2019/0227902 A1 * | 7/2019 | Cheng ....................... | G06F 8/71 |
| 2020/0225945 A1 | 7/2020 | Wright et al. | |

* cited by examiner

*Primary Examiner* — Ryan D. Coyer
(74) *Attorney, Agent, or Firm* — Workman Nydegger

(57) ABSTRACT

Methods, systems, and apparatus, including computer programs encoded on computer storage media, for obtaining a commit time history of a developer entity, wherein the commit time history indicates, for each unit time interval of a plurality of unit time intervals, whether or not the developer entity committed source code during the unit time interval; and generating a model that takes the commit history as input and generates an output sequence of final probabilities, each final probability representing how likely it was that the developer entity was active during the corresponding unit time interval.

20 Claims, 12 Drawing Sheets

COMPUTING ELAPSED CODING TIME

CROSS REFERENCE TO OTHER APPLICATIONS

This application claims the benefit under 35 U.S.C. § 119(e) of the filing date of U.S. Patent Application No. 62/669,596 for CODING TIME AND CODING OUTPUT, which was filed on May 10, 2018, and is incorporated here by reference.

BACKGROUND

This specification relates to analysis of computer software source code.

Source code is typically maintained by developers in a code base of source code using a version control system. Version control systems generally maintain multiple revisions of the source code in the code base, with each revision referred to as a snapshot. Each snapshot specifies differences in the source code of files of the code base as the files existed at a particular point in time. The code base can store source code for one or more software projects.

A collection of all snapshots stored in a version control system can be represented as a directed, acyclical revision graph. Each node in the revision graph corresponds to a commit of the source code. A commit includes a snapshot as well as other pertinent information about the snapshot such as the author of the snapshot, and data about ancestor commits of the node in the revision graph. A directed edge from a first node to a second node in the revision graph indicates that the commit represented by the first node is the direct predecessor to the commit represented by the second node.

Computing reliable predictions about software development productivity is notoriously difficult. There are a variety of reasons for this. For one thing, the job of software engineering encompasses a complex collection of activities that often occur at irregular intervals. Developers take vacations, have meetings, and ramp up on new projects. Therefore, the observed output of software development activities is noisy, often sparse, and has values with widely varying distributions depending on the time of year or day of the week. Observed output can also vary substantially from one developer to the next. As a result, conventional techniques are highly unreliable, tend to be overly optimistic, and suffer from over-confidence in accuracy. Many conventional techniques also rely on manually gathered data and subjective methodologies, which can be costly, inaccurate, and invasive.

SUMMARY

This specification describes a source code analysis system that can compute predictions about coding time spent by developer entities and coding output contributed by developer entities automatically by using large empirical datasets in a principled way.

In this specification, a developer entity can be a single developer or a group of multiple developers. For example, a developer entity can be developers on a team, developers within a department of an organization, or any other appropriate group of developers. For clarity of presentation, where a single developer is mentioned, the same techniques can be applied equally to any appropriate developer entity.

Coding time can be expressed in any appropriate unit of duration of time, e.g., seconds, minutes, hours, days, or weeks. For simplicity of presentation, the examples below may use hours as an example unit of duration.

Coding time represents how much time a developer spent coding between commit intervals. In other words, between two commits by the developer to a version control system, coding time represents what fraction of the duration of time between the commits the developer was actually coding.

Coding time over a commit interval is thus always less than or equal to the duration between commits that define the commit interval. The source code analysis system can make a prediction about the coding time spent by the developer. For example, as a commit interval gets smaller, the likelihood that the developer was coding during the whole commit interval increases. The likelihood that a developer was coding during a random point in the commit interval is significantly higher for a commit interval of 5 minutes versus a commit interval of two weeks.

Predicting coding time accurately is difficult because coding time is highly dependent on the individual habits of the developer, e.g., when the developer typically works or how often the developer takes breaks. The system can generate a per-developer coding time model to generate coding time predictions based only on a version history of the developer's commits to a version control system of a software project. As discussed below, the source code analysis system can automatically discover rhythmic trends in the developer's coding tendencies to generate more reliable predictions than previous approaches. The source code analysis system can make accurate predictions without additional information about the developer, e.g., without additional information about when the developer works or what time zone the developer works in.

Coding output, in contrast to coding time, is a measure that quantifies the working effort that a particular source code change would typically take to be written by a standard developer as defined by the coding activity of a reference population of developers. The coding output can be expressed as a representative duration of time.

For example, a commit can have a coding output of 1.4 hours, meaning that the source code changes in the commit to a project would take a standard developer 1.4 hours to complete. More experienced developers will generally make source code changes in less time than the coding output of the commit, while less experienced developers will generally make source code changes in more time than represented by the coding output of the commit.

The standard developer is defined according to a coding output model that is a predictive model trained using a large representative population of developer data. However, the resulting model is not used for prediction but rather as a standard of measurement according to the population represented by the training data. Specifically, the output of the coding output model is not a prediction of how long it actually took for the author of the source code change to write the code, but rather is a representative duration that quantifies how long the standard developer would take to write the change. In other words, the coding output model measures a "worth" of the source code change, in terms of a duration of time spent by the standard developer to make the source code change. By measuring the value of a source code change in this way, source code change can be valued and compared, regardless of the individual time required by a developer to make the change.

For example, a population of developers typically takes more coding time to add a whole new feature to a software project than to add getter and setter methods for fields in an object class. As a consequence, the inherent "worth" measured by the coding output will be significantly higher for the former (i.e., new feature) as compared to the latter (i.e., getters and setters). This relative valuation remains true even in circumstances where an individual developer copy-and-pastes source code implementing the new feature from another project but codes the getter and setter methods for the fields of an object class by hand. In those circumstances, the individual developer has productively re-purposed existing code to achieve a more efficient use of their coding time than is typical in the population, as represented by the standard developer.

As another example, regardless of how long a source code change actually took to produce, an output of only two lines of source code is naturally less valuable on average than an output of one hundred lines of source code. The coding output model thus defines a standard way to measure the working effort that was actually delivered by a source code change. As another example, the source code analysis system can find changes to a public method to be generally more valuable than changes to a private method, at least because a public method is more likely to affect other parts of a software project than a private method, and therefore higher care is required to correctly implement changes.

The source code analysis system can train the coding output model using a raw commit history of a population of developers. To generate accurate coding output predictions, the source code analysis system can use the coding time model to automatically generate time durations for the training data. In other words, the coding time model can be used to predict coding time between commits that is missing from a raw commit history of a developer.

Particular embodiments of the subject matter described in this specification can be implemented so as to realize one or more of the following advantages.

The source code analysis system can predict coding times and accurately value a source code change. The system can generate coding outputs that are linearly proportional to the effort required by a standard developer to make the change. Even considering a multitude of developers of different skill levels, the system can measure a coding output for a source code change, which enables accurate quantitative and qualitative analysis based on generated coding output.

For example, the system can compare coding times for different developer entities against a coding output for source code changes to a project, to determine the more efficient developer entity. The system can generate coding outputs for source code changes across different software domains to compare the inherent difficulty for developer entities to develop in one domain as compared to other domains. Within a domain, the system can generate coding outputs for different techniques or proposed solution implementations in source code, and identify from the coding output which approach or technique is more efficient. The system can analyze the individual performance of a developer entity across a period of time, and flag periods where a developer entity is more efficient or less efficient. These identified periods of time can correspond to a developer entity's concentration during those periods, and prompt the developer entity to make changes to their work routine accordingly.

The techniques described below outperform all other known approaches of measuring developer efficiency. In fact, all other known approaches completely fail this basic coding standard criteria due to the highly variable, highly noisy, and sparse nature of commit history coding data. By predicting the times during commit intervals when a developer is coding, the system can generate an estimated duration of time spent coding and compare developer efficiency against a coding output for the source code change, even if the exact times spent by developers to make each source code change are not known.

When the coding output predictions are based on sufficiently large training collections, the coding output predictions outperform previous techniques for estimating the clock time of coding activity according to a variety of predictive metrics. If the coding output model is a good coding standard, an average of predictions for similarly sized code changes should be close to an average of actual coding times for those code changes. The techniques described below outperform all other known approaches. In fact, all other known approaches completely fail this basic coding standard criteria due to the highly variable, highly noisy, and sparse nature of commit history coding data.

The predictions of the source code analysis system are based on empirical data and are more robust than previous approaches against the inherent noisiness and high variability of software engineering data. The techniques described are completely automatic and do not rely on subjective methodologies or manual data collection or expert opinions. The collection and generation of training data is also automatically performed as a result of widely available data relating to software engineering, e.g., version control data. The methods additionally do not require tracking developer activity beyond a commit history that is already tracked by a version control system. In fact, the system can also generate an accurate coding time model with rudimentary raw commit history data, e.g., with only the times commits that were pushed to a version control system.

The system can generate a coding time model that automatically discovers rhythmic trends in the software engineering data of individual developers. Unlike conventional methods, the parameters found with the coding time model can change over time to reflect different tendencies to engage in different behaviors that are inherent in data that has such naturally occurring rhythmic trends. The system can generate a representation of the commit data that allows multiple segments of the commit history data to be trained in parallel, possibly on multiple machines.

The source code analysis system can also generate a coding output model that generates coding time predictions based on only features of source code of the commits. The coding output model generates predictions that more accurately capture the behavior of standard coders compared to prior approaches, e.g., linear regression and random forests, which generate models that cannot be accurately validated against the training data.

BRIEF DESCRIPTION OF THE DRAWINGS

Like reference numbers and designations in the various drawings indicate like elements.

DETAILED DESCRIPTION

Figure 1:
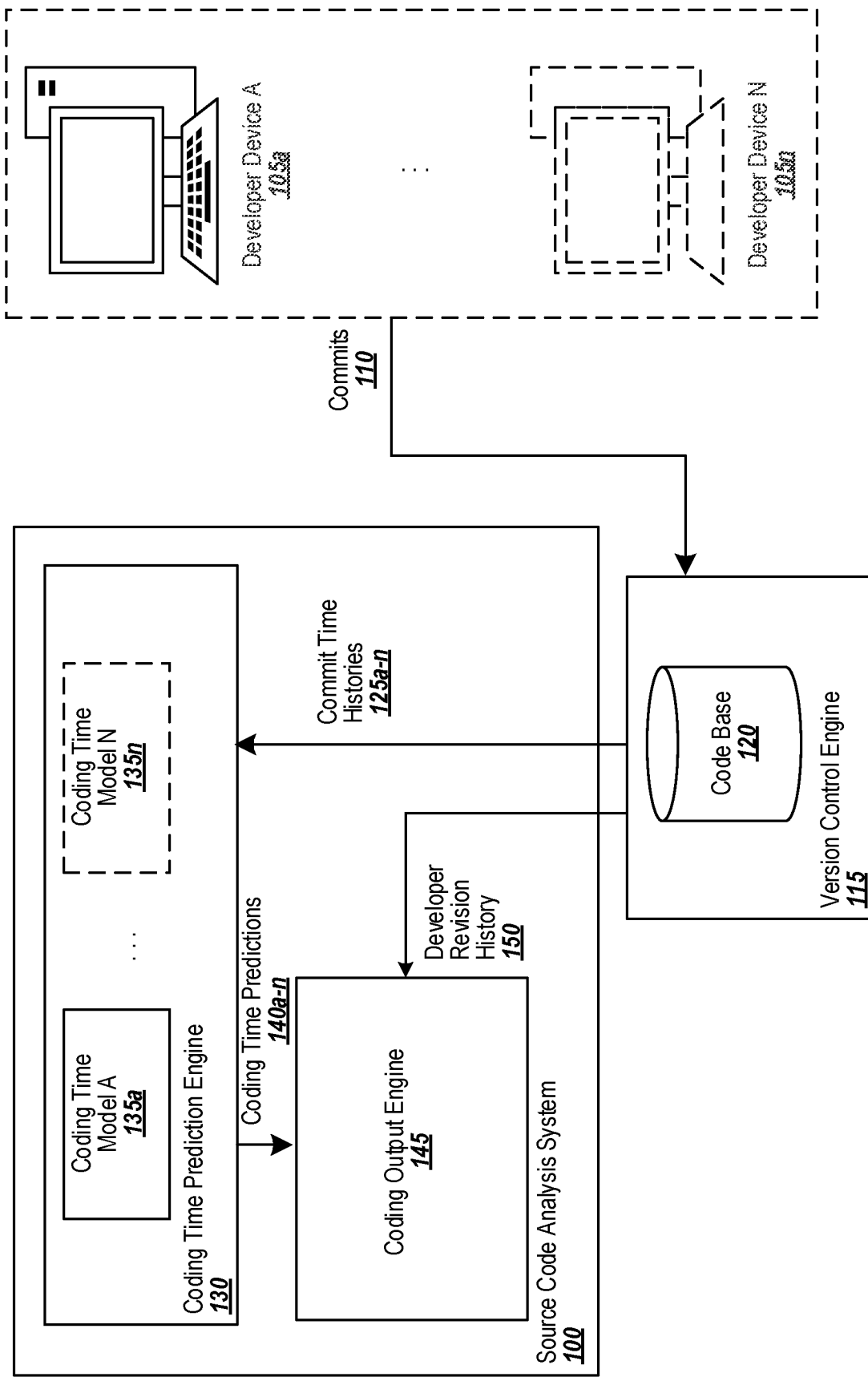
FIG. 1 illustrates an example source code analysis system interacting with multiple developer devices.

FIG. 1 illustrates an example source code analysis system 100 interacting with multiple developer devices 105a-n. Each developer device can be associated with a respective developer entity, e.g., developer device A 105a is associated with developer A, and developer device N 105n is associated with developer N.

Each developer device 105a-n can be any computer appropriately configured to communicate with the source code analysis system 100, e.g., a laptop, smartphone, or tablet. Each developer device 105a-n can communicate with the system 100 over any appropriate network, e.g., a local intranet or the Internet, or a combination of both. Each developer device 105a-n can be directly connected to the source code analysis system 100, e.g., by cables, or the system 100 can be installed in whole or in part on each developer device 105a-n.

A developer can send commits to a version control engine 115 from a plurality of developer devices. In some implementations, the version control engine 115 is configured to associate commits received from a plurality of developer devices with a respective developer. For ease of description, in this specification, developers will be described as associated with just one developer device, i.e., each developer will send respective commits to the version control engine 115 from only one developer device of the developer devices 105a-n.

The system 100 can be configured to interact with many developers, e.g., tens of thousands, and each developer can send commits 110 to a version control engine 115 maintaining a code base repository 120 storing one or more projects. In some implementations, the control analysis system 100 includes the version control engine 115. The version control engine 115 can be configured to perform functions related to maintaining revisions of projects stored in the code base 120, e.g., receiving commits 110 from developer devices 105a-n, maintaining a log of commits to each project, modifying a project according to a received commit, maintaining information related to the commit and the developer of the commit, and updating a snapshot revision graph representing revisions of a project in the code base 120. Each developer devices 105a-n can send zero or more commits to the version control engine 115 over a period of time, The code base repository 120 can store many software projects, e.g., thousands of software projects. The version control engine 115 can receive commits for the same or different projects, from developers contributing to those projects. Each commit 10a-n describes a snapshot of the project a contributing developer is working on, as well as information about that contributing developer and metadata for the snapshot.

The version control engine 115 can be configured to store, at the code base repository 120, information about each commit, including: a date and time a commit was received, a code delta representing a difference between a preceding version of a project and the snapshot in the commit.

The version control engine 115 can be configured to store, at the code base repository 120, information about each developer sending a respective commit, including: the name of the developer, the projects the developer is working on, and an interval of time representing the clock time since the last time a developer submitted a commit.

The version control engine 115 can generate and send commit time histories 125a-n to a coding time prediction engine 130. Each commit time history 125a-n represents when a respective developer submitted commits to the version control engine 115 over a period of time. The period of time can be, for example, two years, and the period of time can be broken into unit time intervals, e.g., one minute intervals. At each unit time interval, the commit history for the developer represents whether the developer submitted a commit to the version control engine 115 during that unit time interval. Unit time intervals can be any unit of time, e.g., 1 minute, 30 seconds, 2 hours, or 1 day.

If unit time intervals are of length 1 minute, then in some implementations the source code analysis system 100 can receive the commit time histories 125a-n and can round a time a commit was sent to the version control engine 115 by a developer to the nearest minute. In those implementations, the version control engine 115 can limit a developer to sending a commit to a project to only once per minute, so that each unit time interval can represent no more than one commit. Alternatively, in some implementations, the source code analysis system 100 can combine commits received in close succession, e.g., one or two unit time intervals, into one commit corresponding to the cumulative code changes represented by the combined commits and at the time of the latest successive commit. By combining commits within a unit time interval, no single unit time interval includes more than one commit.

A commit time history can be represented as any appropriate representation of unit time intervals in which an event, i.e., a commit, may or may not occur. For example, the commit time history can be represented as an encoded string of timestamps representing unit time intervals, with flags for each timestamp representing whether a commit was sent to the version control engine 115 by a respective developer during the unit time interval represented by the timestamp. The commit time history can be only a portion of the entire commit time history for the developer, e.g., a commit time history representing only the past two years of commits sent by the developer.

In this specification, a "commit interval" refers to one or more unit time intervals between commits in a commit history. In general, the shorter a commit interval, the more likely a developer was coding at any given point during that commit interval. On the other hand, the longer a commit interval, the less likely a developer was coding at any given point during that commit interval. For example, a commit interval of a few hours may indicate that the developer took a break between commits, but may still have been coding during at least part of that interval. As another example, a commit interval of 10 minutes can indicate that the developer was working continuously during that commit interval.

The coding time prediction engine 130 can be configured to maintain coding time models 135a-n. In general, a coding time model is a machine learning model that is trained to predict transition and commit probabilities of activity for a developer, at each unit time interval. Transition probabilities refer to two probabilities related to a developer's activity: a start probability indicating the probability an inactive developer will become active during a unit time interval, and an end probability indicating the probability an active developer will become inactive. Commit probability refers to the probability indicating an active developer will commit during a unit time interval.

In general, the coding time prediction engine 130 can predict a probability that a developer is active by analyzing sparse and often infrequent "signs of life." Specifically, by analyzing a history in time having intervals where a developer is by definition active, the coding time prediction engine 130 can generate transition probabilities representing when the developer goes from inactive to active, or vice versa, at any given unit time interval.

For example, the "signs of life" of a developer can be the commits she sends to the version control engine 115. If a developer sends a commit to the version control engine during a unit time interval, then the coding time prediction engine 130 can be configured to interpret the developer as being active during that unit time interval. The source code analysis system 100 interprets an active developer as a developer that is currently coding, and interprets an inactive developer as a developer that is not currently coding.

Although this specification discusses activity in terms of coding or not coding, the coding time models A-N 135a-n can be trained to track other developer activities, such as working in general, e.g., not specifically coding but still being productive according to some predetermined criteria; or being in a particular place versus not, e.g., the office. In those implementations, the coding time prediction engine 130 can function generally as an activity time prediction engine, and receive an activity history that indicates, at each unit time interval, whether the developer is performing a specific activity.

Each coding time model 135a-n can be trained specific to a respective developer. For example, coding time model A 135a can be trained specifically to generate transition probabilities for developer A given a commit history for developer A. Throughout this specification and unless otherwise noted, reference to a developer in the context of a coding time model refers to the developer that a coding time model is specifically trained to predict transition probabilities.

The coding time prediction engine 130 can receive, as input, a commit time history for a respective developer over a period of time, and generate, as output, a sequence of values, referred to as a coding time prediction. Each value in the coding time prediction corresponds to a respective unit time interval in the period of time spanned by the commit time history, and represents a predicted probability that the developer was coding during that unit time interval.

The coding time prediction engine 130 can aggregate each value corresponding to a respective unit time interval in the coding time prediction to estimate a respective coding time spent by the developers on the commits 110. For example, the coding time prediction engine 130 can generate an estimated coding time by adding each value and then multiplying by the length of a unit time interval.

The source code analysis system 100 can also include a coding output engine 145. The coding output engine 145 can be configured to generate a coding output, given a source code change, e.g., represented by a developer revision history 150. The developer revision history 150 can represent any data maintained by the version control engine 115 for a project stored in the code base 120. The developer revision history 150 can include the commit time histories 125a-n, as well as any information maintained by the version control engine 115 related to each developer.

The coding output for a source code change represents the length of coding time a standard developer would take to perform the changes in source code represented by the commit. The "standard developer" is defined according to a distribution learned by a coding output model maintained by the coding output engine 145.

As discussed below, the coding output engine 145 can train a plurality of coding output models for a plurality of programming languages to learn a probability distribution representing the coding output for a source code change in that programming language. The coding output engine 145 can generate training examples of source code changes represented by commits in the developer revision history 150. The coding output engine 145 can label each source code change training example with a respective coding time, e.g., by first generating the coding time predictions 140a-n for the commit histories 125a-n. Once trained on a commit time history for a reference population, the coding output engine 145 does not require further coding time predictions from the coding time prediction engine 130.

Figure 2:
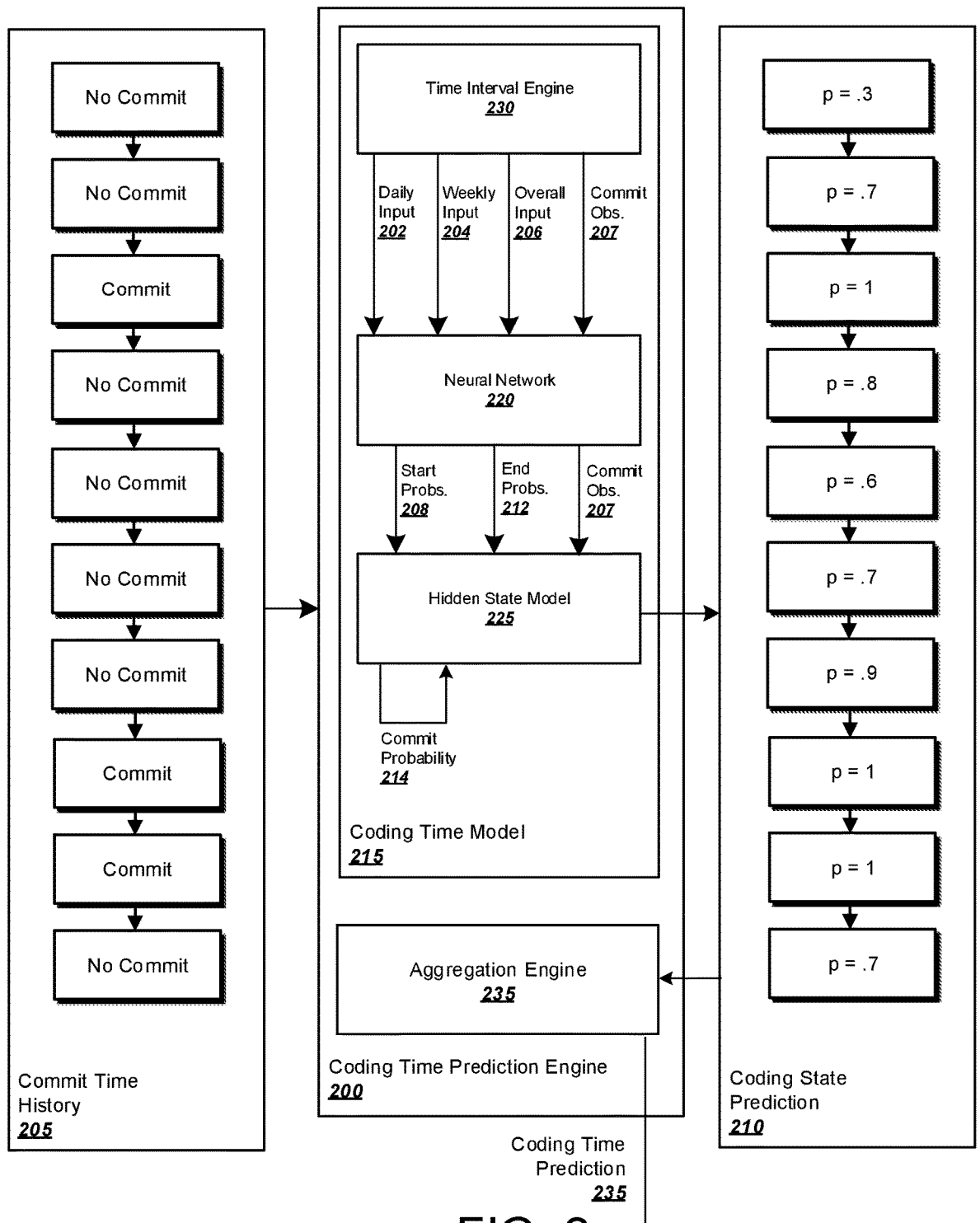
FIG. 2 illustrates an example coding time prediction engine receiving a commit history and generating a coding time prediction.

FIG. 2 illustrates an example coding time prediction engine 200 receiving a commit history 205 and generating a coding time prediction 210. The coding time model 215 includes a neural network 220 and a hidden state model 225, collectively referred to as a neural hidden state model. The coding time model 215 also includes a time interval engine 230 and an aggregation engine 235.

In general, the neural network 220 can be trained to receive inputs 202, 204, 206, and commit observations 207 that collectively represent a commit time history 205, and output, for each time interval in the commit history 205, predicted transition probabilities for the developer corresponding to the commit history 205. Transition probabilities include start probabilities 208 and end probabilities 212.

The start probabilities 208 represent predicted probabilities that the developer will start coding at each unit time interval. The end probabilities 212 represent predicted probabilities that the developer will stop coding at each unit time interval. The hidden state model 225 can be trained to receive the start probabilities 208, the end probabilities 212, the commit observations 207 and the commit probability 214, as input, and generate, as output, a coding state prediction 210, representing a probability that the developer is coding at each unit time interval.

Both the neural network 220 and the hidden state model 225 can receive the commit observations 207, as input. The commit observations 207 indicate, at which unit time intervals, a commit is recorded in the commit time history 205.

The commit probability 214 represents the probability a developer will send a commit to the version control system when the developer is active. Because a developer is considered to be coding during the unit time interval when a commit is sent, and is very likely to have been coding for some duration of time before and some duration of time after sending the commit request, the coding time prediction engine can use the commit probability 214, the start probabilities 208, and the end probabilities 212 to generate the coding state prediction 210.

The coding time prediction engine 200 can train the coding time model 215 to learn the commit probability 214, as well as the transition probabilities for each unit time interval. For ease of reference, this specification will sometimes refer to the start probabilities 208 as S(t), the end probabilities 212 as E(t), and the commit probability as C. The ranges of S(t) and E(t) represent the start and end probabilities at each unit time interval t and in this specification will sometimes be referred to as S and E, respectively. During training, the coding time prediction engine 200 can begin with an initial value C, and perform a forward pass over the neural network 220 with initialized weights to generate S and E. Then, to train the neural network 220, the coding time prediction engine 200 computes a measure of "strangeness" for the coding time prediction 210. The measure of "strangeness" of a coding time prediction 210 quantifies the difference between the expectation for a number and distribution of commits in a commit history based on S, E, and C; and the actual number and distribution of commits in the commit history. The hidden state model 225 can compute a measure of strangeness for fixed values of S(t), E(t), and C, as discussed below with respect to FIG. 4.

For example, if the coding time prediction engine 200 expects a low number of commits in a commit history, but instead observes many commits, then this results in a high measure of strangeness. As a result, the computed strangeness can be a loss function that the coding time prediction engine 200 can try to reduce, by modifying C and by updating weights in the neural network 220, which in turn, updates the values for S and E.

The time interval engine 215 can receive the commit history 205 and generate a plurality of periodic inputs, i.e., the daily input 202 and the weekly input 204, for the neural network 220. As discussed above, the period of time that the commit time history 205 spans is divided into unit time intervals, and at each interval the commit time history 205 represents whether or not a commit sent by the developer during the unit time interval. The time interval engine 215 can represent each unit time interval as a point on a circle graph representing a periodic length. For example, the periodic length can be a day, a week, a month, or a year, and each periodic length can correspond to a respective periodic graph.

Figure 3:
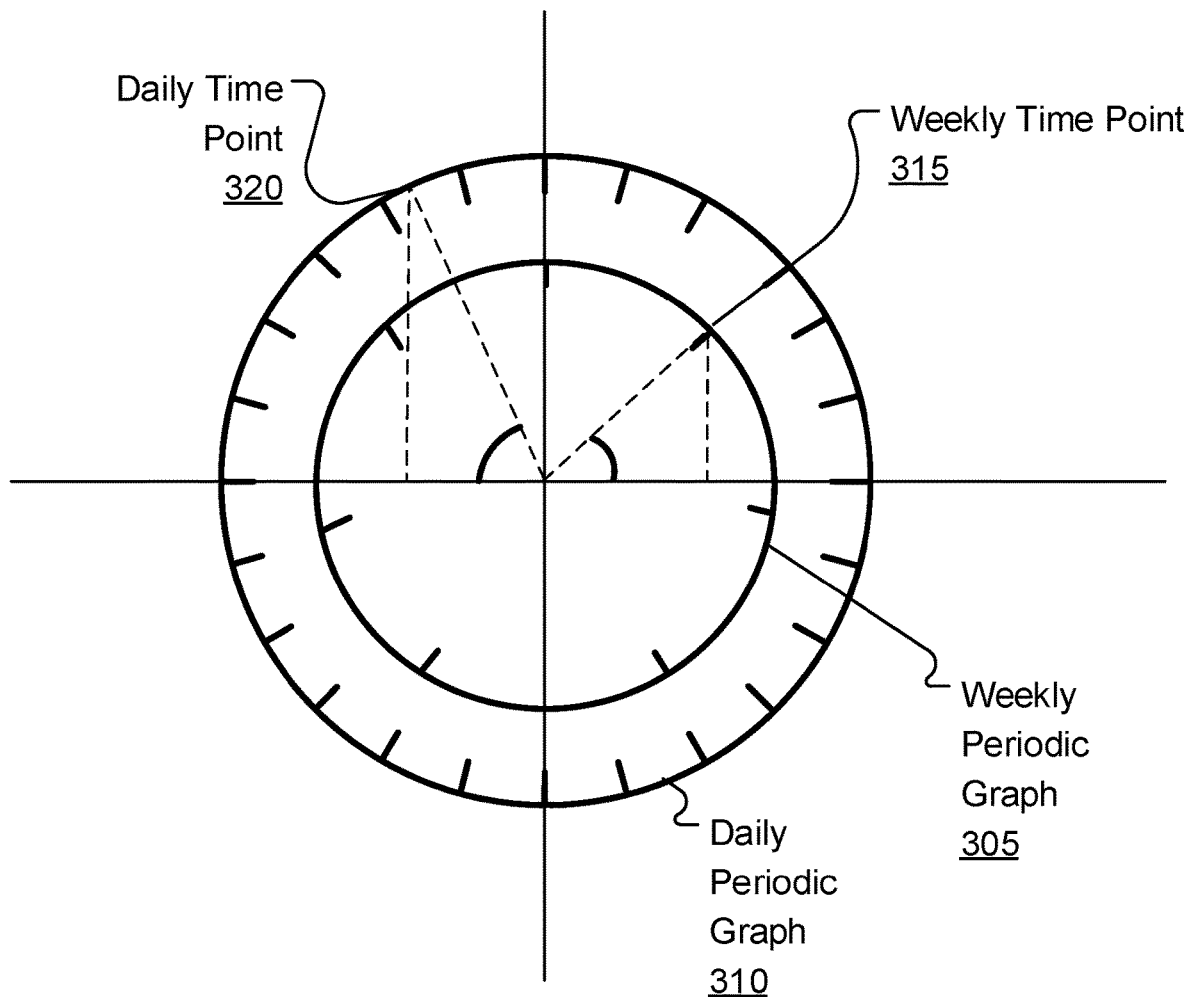
FIG. 3 illustrates a time interval represented as points on a daily and weekly periodic graph.

FIG. 3 illustrates a unit time interval represented as points on a daily and weekly periodic graph. Weekly periodic graph 305 represents a periodic length of 7 days. The weekly periodic graph 305 can be thought of as an analog clock face, but representing days of the week instead of hours in a day. Daily periodic graph 310 represents a periodic length of twenty-four hours, also similar to an analog face clock, but having all twenty-four hours shown on the clock face instead of only twelve hours. Therefore, a unit time interval can be represented as two points, a weekly time point 315 and a daily time point 320.

Although the weekly periodic graph 305 is shown as smaller than the daily periodic graph 310, all periodic graphs can be normalized to be represented as a unit circle.

Representing time intervals as points on a daily and weekly periodic graph facilitates training the neural network 220 to recognize cyclic patterns of a developer's activity. By recognizing a developer's patterns, the neural network 200 can better predict start and end probabilities at each unit time interval.

With this periodic graph representation, the neural network 220 can learn patterns for each periodic length without any additional prior knowledge. For example, some aspects of a developer's activity may be part of a daily routine, e.g., a night owl developer with a tendency to work at night versus during the day. Therefore, the neural network 220 can learn to assign higher start probabilities for the developer for time intervals during the night, as opposed to during the day. Other aspects of a developer's activity may not be so easily discernible from analyzing the commit history on a daily basis, e.g., the fact that a developer does not work on the weekends. Therefore, the neural network 220 can learn to assign lower start probabilities during weekends, all without receiving additional information about the developer's work patterns.

The time interval engine 230 can be easily adjusted for shifts in time, e.g., daylight saving time. As necessary, the time interval engine 215 can be configured to generate periodic inputs for different periodic lengths, such as hourly and daily, or weekly and monthly.

The time interval engine 230, unlike the neural network 220 and the hidden state model 225, is not specific to a particular developer. In some implementations, the time interval engine 230 can be a component of the coding time prediction engine 200 generally. In those implementations, the coding time prediction engine 200 processes the received commit history 205 through the time interval engine 230 before sending the periodic inputs to the coding time model corresponding to the developer whose commits are represented in the commit history 205.

The time interval engine 215 can also generate an overall input 206 for the neural network 206. The overall input 206 represents the total time spanned by the commit history 205. From the overall input 206, the neural network 220 can learn shifts in patterns for a developer. During a period of time spanned by the commit time history 205, a developer's weekly and daily habits may shift as a result of changes of circumstance, e.g., because the developer previously worked part-time and now works full-time. The neural network 220 can learn these shifts in coding habits automatically, without any additional input, and learn corresponding transition probabilities during the unit time intervals of those periods of shifted patterns. The overall input 206 can be normalized, e.g., within the interval [0, 1] by mapping each time interval in the period of time spanned by the commit history 205 as a value in the interval.

The neural network 220 can receive, for each unit time interval in the commit history 205 the daily input 202 and the weekly input 204 as Cartesian coordinates representing a daily time point and a weekly time point on periodic circle graphs. In addition, the neural network 220 can receive the overall input 206 and the commit observations 207.

The hidden state model 225 can receive the start probabilities 208, the end probabilities 212, the commit observation 207, and the commit probability 214, as input, and generate an updated commit probability and the coding state prediction 210, as output.

The coding time prediction engine 200 can initialize the values of the weights, and of the commit probability, by any appropriate technique, e.g., randomly.

The hidden state model 225 can be, in some implementations, similar to a hidden Markov model. Notably, in those implementations, the hidden state model 225 is a hidden Markov model that has been modified to receive state transition probabilities that vary with time. This is because S and E represent start and end probabilities, respectively, that vary depending on the unit time interval. Returning to the example of the night owl developer, start probabilities for the night owl developer will be higher for time intervals during night than for time intervals during the day.

In contrast to S and E, the commit probability 214 generally does not vary with time. In some implementations, however, the coding time prediction engine 200 trains the coding time model 215 to generate commit probabilities that do depend on time.

The hidden state model 225 can model one of two states: "coding" and "not coding," and can populate state transition probabilities with the transition probabilities generated by the neural network 220. At each unit time interval in the commit history 205, the developer is considered to be in one of those two states. The hidden state model 225 can infer the shared probability distribution for these states over different unit time intervals.

Figure 4:
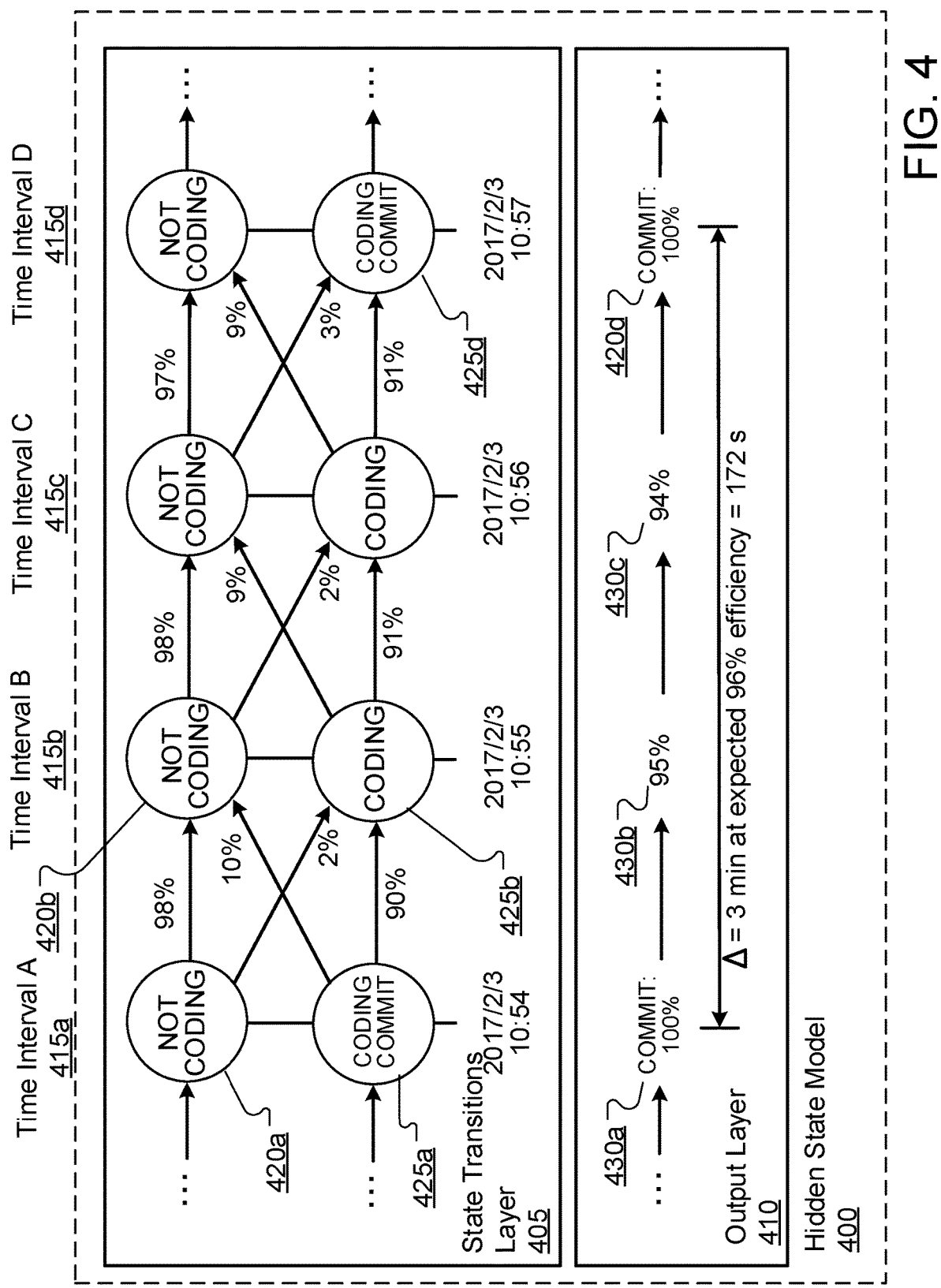
FIG. 4 illustrates a portion of an example hidden state model.

FIG. 4 illustrates a portion of an example hidden state model 400. The hidden state model 400 includes a state transition layer 405 and an output layer 410. The state transition layer 405 includes "not coding" and "coding" states at each unit time interval 415*a-d*. FIG. 4 illustrates only a portion of a complete hidden state model, and in general a hidden state model will have as many pairs of coding/not coding states as there are unit time intervals in a commit time history. For example, a complete hidden state model can have a number of state pairs for each unit time interval, in the order of millions.

Each unit time interval 415*a-d* represents a minute, for an overall time period ranging from 10:54 AM on Feb. 3, 2017, to 10:57 AM on the same day. Unit time interval 415*a* and unit time interval 415*d* represent intervals during which the developer sent a commit to a version control system, indicated in coding state 425*a* and coding state 425*d*, respectively.

Each state for each unit time interval except the last unit time interval represented in the state transitions layer 405 has two edges connecting the state to the states in the next time interval. Both edges for each state are weighted with a transition probability representing with what predicted probability the developer will move to a state at the next unit time interval. For example, if the developer is currently not coding at time interval B 415*b* (represented by state 420*b*), then the developer will transition to a "not coding" state 420*c* in unit time interval C 415*c* with a 98% probability, and transition to a "coding" state 425*c* in unit time interval C 415*c* with a 2% probability.

The hidden state model 400 can populate the probabilities for every edge in the state transition layer 405 using start probabilities and end probabilities generated by a corresponding neural network, e.g., the neural network 220 of FIG. 2. The hidden state model 400 can populate, at each time interval, edges connecting a "not coding" state to a subsequent "coding" state with the respective start probability predicted by the neural network for that time interval. Similarly, the hidden state model 400 can populate, at each time interval, edges connecting a "coding" state to a subsequent "not coding" state with the respective end probability predicted by the neural network for that time interval.

Notably, the hidden state model 400 need not represent what state a developer is in at each unit time interval, but rather can represent a probability that a developer will transition to a state in the next time interval, according to learned transition probabilities.

For each time interval 415*a-d*, the hidden state model 410 can generate a coding state probability as an output in the output layer 410. Each coding state probability 430*a-d* represents a predicted probability that the developer is coding during a respective unit time interval. If a commit has been sent during a unit time interval, then the coding state probability for that unit time interval is 1. Coding state probabilities 430*b* and 430*c* represent a predicted probability that the developer was coding during a commit interval between unit time interval A 415*a* and unit time interval D 415*d*. The coding state probabilities 430*b* and 430*c* are high-95% and 94%, respectively—in this example, which is consistent with a general observation that small commit intervals generally indicate that the developer is coding throughout the commit intervals.

As discussed above, the hidden state model 400 can compute a measure of strangeness. First, the values for S(t), E(t), and C are fixed. Then, for commit histories having T unit time intervals, SEQ(T) defines the set of all sequences of coding/not-coding that a developer could be in for each unit time interval. For example, SEQ(2) defines the set {{coding, not coding}, {not coding, not coding}, {not coding, coding}, and {coding, coding}}, where each member of SEQ(2) represents a respective sequence of coding states a developer can be in over two unit time intervals.

The hidden state model can compute the probability that a developer is coding or not coding throughout the unit time intervals that reflects a member-sequence in the set SEQ(T). The sum of all of the probabilities for the member-sequences is 1. The hidden state model can generate observed sequences from commit time histories of a developer and using S, E, and C. Then, the hidden state model can match the observed sequences with member-sequences in SEQ(T). Observed sequences that have a matching member-sequence in SEQ(T) are called consistent sequences.

The hidden state model can compute the measure of strangeness as 1 minus the sum of the probabilities of all of the consistent sequences.

The closer the actual values of E, S, and C are to the ground truth values, the smaller the measure of strangeness, reflecting more consistent sequences. On the other hand, when there are fewer consistent sequences, this is considered "strange" and is reflected in a higher measure of strangeness. The measure of strangeness can then be used as a loss function to train the coding time model.

Figure 5:
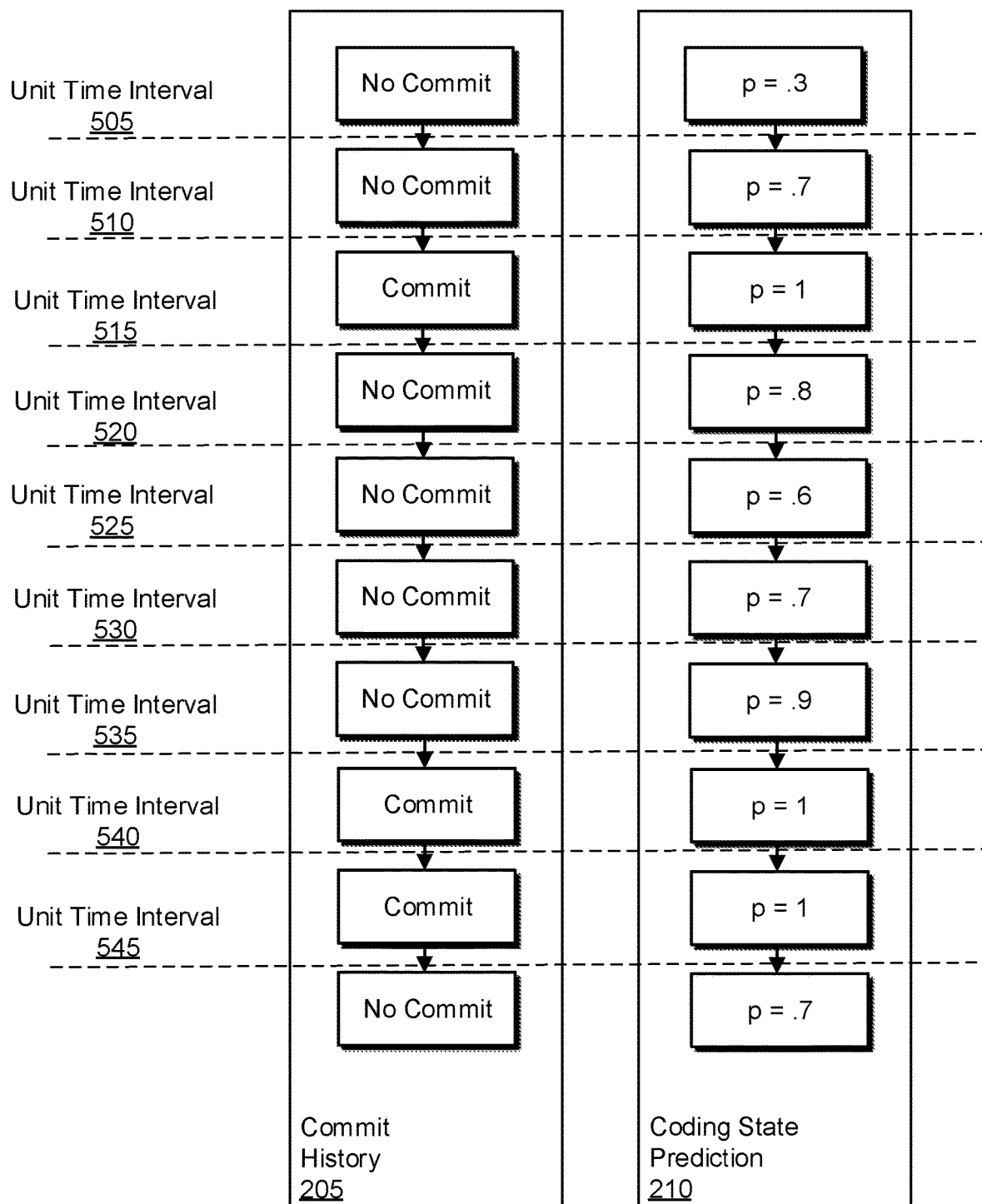
FIG. 5 illustrates the commit history and the coding time prediction for the commit history of FIG. 2.

FIG. 5 illustrates the commit history 205 and the coding prediction 210 for the commit history 205 of FIG. 2. For ease of reference, unit time intervals 505-545 each show whether or the commit history 205 includes a commit by the developer at that time interval, as well as the corresponding coding probability at that unit time interval. For unit time intervals during which a commit was recorded, e.g., unit time intervals 515, 540, and 545, the corresponding coding state probability is 1.

The commit probabilities for unit time intervals near a unit time interval representing a commit are high, e.g., unit time interval 510 and unit time interval 520 have coding state probabilities of 0.7 and 0.8, respectively. The high coding state probabilities near unit time intervals representing a commit correspond to a high probability that the developer was coding immediately before and immediately after making a commit.

When a unit time interval is further away from a unit time interval during which a commit occurred, the coding state probability for the unit time interval is lower. For example, unit time interval 525 has a coding probability of 0.6, which is lower than neighboring unit time intervals that are closer to unit time intervals during which commits occurred. At those unit time intervals, there is a lower predicted probability that a developer is coding, e.g., because the developer may be taking a break.

Referring to FIG. 2 and FIG. 5, the aggregation engine 235 can receive the commit time history 205 and the coding state prediction 210 and generate the coding time prediction 215, for each commit interval. Specifically, the aggregation engine 235 can add the individual coding state predictions at each unit time interval, and multiply by the length of the unit time interval. For example, if the unit time interval for the commit time history 205 is 1 minute, then the aggregation engine 235 can receive the commit time history 205 and the coding state prediction at each time interval 505-545 and calculate: (0.3+0.7+1+0.8+0.6+0.7+0.9+1+1+0.7)*1=7.6*1=7.6 estimated minutes spent coding during the time period of ten minutes spanned by the commit time history 205.

Figure 6:
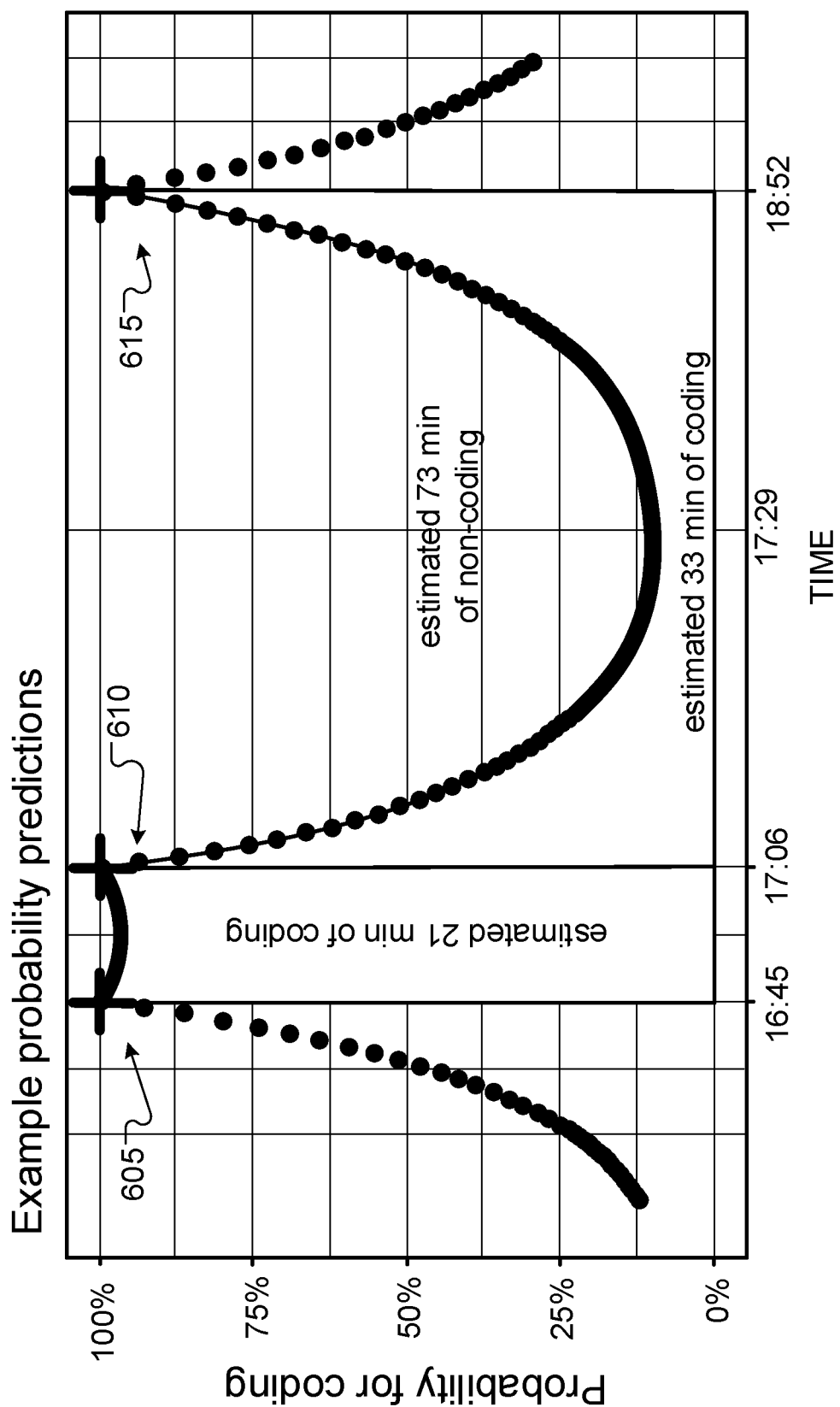
FIG. 6 illustrates a graph representing coding time probabilities over a period of time.

FIG. 6 illustrates a graph representing coding state probabilities over a period of time. Three of the unit intervals represented by the graph contain commits, specifically points 605, 610, and 615. The commit interval between commit 605 and 610 is short and therefore its constituent unit time intervals are assigned a high probability that a developer was coding. By contrast, the commit interval between commit 610 and commit 615 is longer, and therefore indicative of a smaller likelihood that the developer was coding during the entire commit interval.

The coding time prediction engine 210 can aggregate and process every coding state probability for a commit time history to obtain a coding time estimate. In some implementations, the coding time prediction engine 210 can calculate an area under the graph, which represents an estimated duration of how long a developer was coding during a commit interval. For example, in FIG. 6, the coding time prediction engine 200 can estimate that during the commit interval between the commits 605 and 610, the developer was coding for approximately 21 minutes, out of a total of 26 minutes. As another example, the coding time prediction engine 200 can estimate that between the commits 610 and 615, the developer was coding for an estimated 33 minutes, out of a total of 106 minutes.

The coding time prediction engine 210 can generate a probability density representing how likely it is that the developer entity was active for a particular period of time. For example, the coding time prediction engine 210 can receive a time duration of 23 minutes. Then the coding time prediction engine 210 can generate a probability density representing how likely it is that the developer entity was active for a period of time equal to the time duration, e.g., 23 minutes, following a commit represented in the commit time history. The coding time prediction engine 210 can generate the probability density by computing simulated coding states generated from simulations following an inferred posterior distribution of series of coding states, aggregating the total coding time for each simulated coding state, and computing a frequency of coding states that are the same at each unit time interval in the coding time duration.

The coding time prediction engine 200 can train the neural network 220 to learn transition probabilities at each unit time interval. In other words, the neural network learns S(t) and E(t), which receive, as input, a unit time interval t, and generate, as output, a start probability and an end probability for the unit time interval t, respectively. At the forward pass, the neural network 220 can predict transition probabilities for a commit history. The hidden state model 225 can receive the transition probabilities and an initial commit probability, and generate a coding time prediction.

Next, the coding time prediction engine 200 can calculate a measure of strangeness, representing the difference between an observed commit history, and the current values of C, S(t), and E(t) at a unit time interval t. As discussed above, a higher measure of strangeness is indicative of the neural hidden state model observing a commit time history having commits that are relatively unlikely given the current values of S(t), E(t), and C. A lower measure of strangeness is indicative of the neural hidden state model observing a commit history that is consistent with S, E, and C.

The computed measure of strangeness of an observed commit history can be reduced by updating C, and by updating weights for the neural network 220. The coding time prediction engine 200 can update the weights of the neural network using backpropagation with momentum to reduce a computed measure of strangeness.

The coding time prediction engine 200 can operate a respective hidden state model, e.g., the hidden state model 225, in either a "live" mode or a "hindsight" mode.

In general, when the hidden state model 225 switches from live to hindsight mode, the estimated chance of coding normally increases if the next commit is closer is expected, and decreases if further into the future than expected.

In the live mode, the hidden state model 225 is configured to generate a commit probability using only information from previous unit time intervals. In the hindsight mode, the hidden state model 225 is configured to predict a commit probability based on how long ago the last commit was and how far into the future the next commit will be.

For example, if a developer entity tends to commit in more regular intervals than initially predicted by the coding time prediction engine 200, then the chance to be coding, according to the hidden state model 225 in live mode, is higher typically during the first few unit time intervals after the last commit. However, because the developer entity commits at a more regular interval, the next commit arrives later than what is expected by the hidden state model. When the hidden state model 225 switches to hindsight mode and learns exactly when the next commit in the commit time history occurs, the model will correct the probability downward.

The coding time prediction engine 200 can train the coding time model 225 with a "commit cooldown," representing an observed tendency for some developers to stop coding after sending a commit. This tendency can be incorporated into the coding time model 215 by increasing end probabilities for time intervals immediately following a time interval representing a commit.

The coding time prediction engine 200 can be configured to ignore commit intervals longer than a certain period, e.g., four days. By ignoring commit intervals that likely represent absences or vacations when a developer is likely not coding, the coding time prediction engine 200 can reduce the amount of information processed by the coding time model 225, and can therefore train and process inputs to the model faster.

The commit histories can be partitioned to train the coding time model in parallel across a plurality of computing devices. A commit time history can be partitioned such that each partition starts and ends with a time interval representing a commit. In some implementations, the commit time history can be partitioned into sub-histories, with each sub-history trained on different cores of a processing unit, e.g., a GPU. In some implementations, the commit time history can be partitioned into 128 sub-histories, and trained in parallel across a plurality of computing devices. Each sub-history can be represented as a slice of a tensor that represents the commit time history.

Figure 7A:
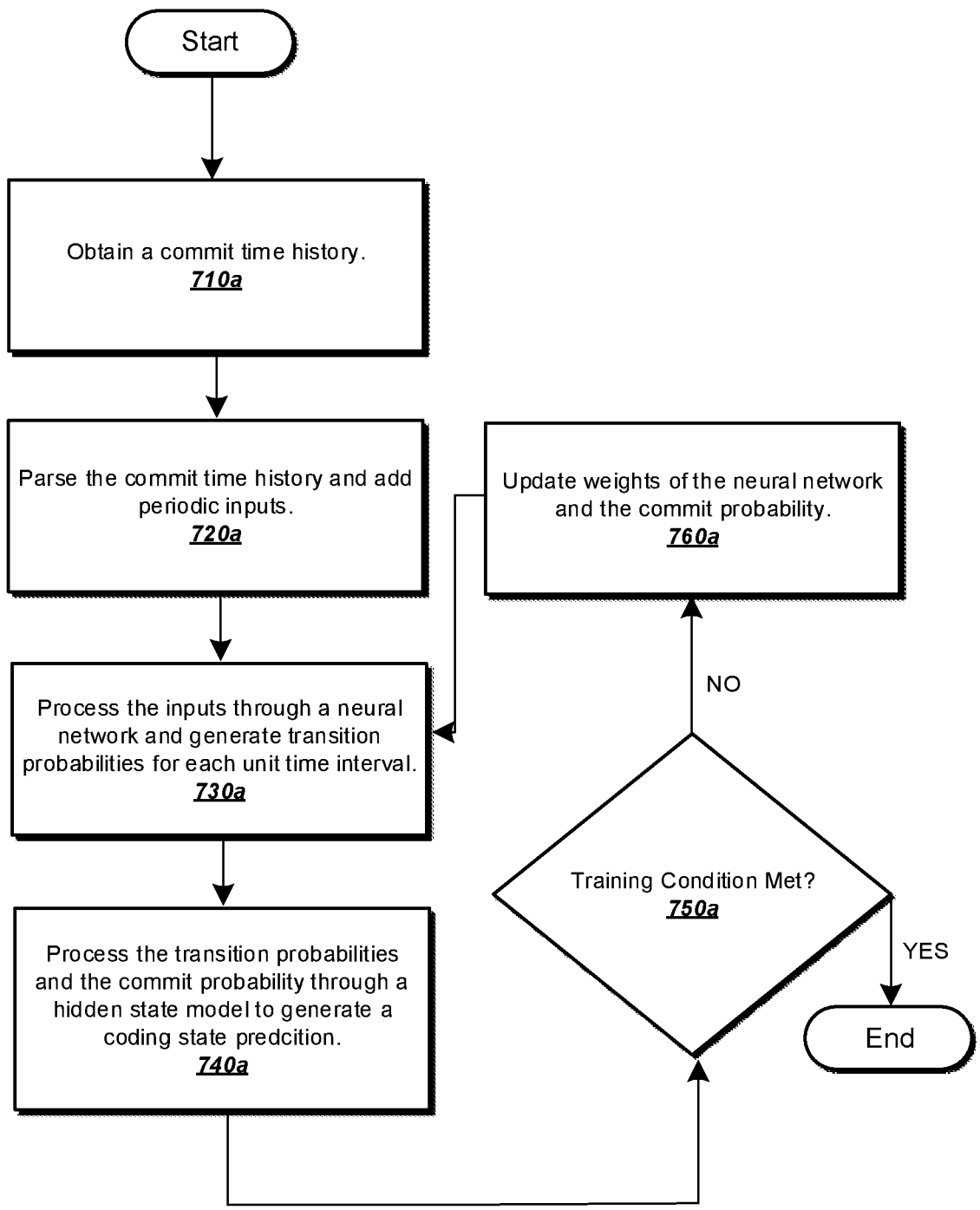
FIG. 7A is a flow chart of an example process for training a neural hidden state model to generate coding state probabilities for each unit time interval of a commit history history.

FIG. 7A is a flow chart of an example process for training a neural hidden state model to generate coding state probabilities for each unit time interval of a commit history, generating a coding time prediction. For convenience, the example process will be described as being performed by a system of one or more computers, located in one or more locations, and programmed appropriately in accordance with this specification. For example, a source code analysis system, e.g., the source code analysis system 100 of FIG. 1, appropriately programmed, can perform the example process of FIG. 7A.

The source code analysis system obtains a commit time history (step 710*a*). As discussed above with respect to FIG. 1, the source code analysis system can obtain a commit time history from a version control system that generates a commit time history for a developer sending commits for a project stored on the code base repository and maintained by the version control system.

The source code analysis system parses the commit time history and adds periodic inputs (step 720*a*). As discussed above with respect to FIG. 2 and FIG. 3, the time interval engine can represent each unit time interval of a commit history as coordinates on periodic graphs, e.g., a weekly periodic graph and a daily periodic graph.

The source code analysis system processes the inputs through a neural network of a neural hidden state model to generate transition probabilities for each unit time interval (step 730*a*). As discussed above with respect to FIG. 1 and FIG. 2, the coding time prediction engine can generate a coding time model that includes a neural network that receives, as input, periodic inputs and an overall input and generates, as output, transition probabilities.

The source code analysis system processes the transition probabilities and the commit probability through a hidden state model to generate a coding state prediction (step 740*a*). As discussed above with reference to FIG. 2 and FIG. 5, the coding state prediction for a commit time history represents with what probability a developer is coding, at each unit time interval. As discussed above with reference to FIG. 6, the source code analysis system can then predict an estimated amount of time a developer was coding during each commit interval in the commit history.

The source code analysis system determines whether a training condition has been met (decision diamond 750*a*). A training condition specifies under what condition or conditions the source code analysis stops training the neural network and hidden state model. For example, the training condition can be that a computed measure of "strangeness" for C, S, and E converges numerically. As another example, the training condition can be that a computed measure of strangeness for C, S, and E is within a predetermined threshold. If the training condition is based on a computed measure of strangeness, then the source code analysis system can compute the measure of strangeness given the commit time history and the current values for C and the ranges of S(t) and E(t). As another example, the training condition can be a predetermined number of iterations of the training process. If the training condition has been met ("YES"), then the process shown in the flowchart in FIG. 7A ends. Otherwise, ("NO"), the process continues to step 760*a*.

The source code analysis system updates the weights of the neural network and updates the commit probability (step 760*a*). As discussed above with respect to FIG. 2, the source code analysis system can update the weights of the neural network using backpropagation with momentum to reduce a computed measure of strangeness.

After updating the weights of the neural network, the system processes the periodic inputs through the neural network with the new weights and generates transition probabilities for each unit time interval (step 730*a*). Then, the system performs step 740*a* and decision diamond 750*a*, and repeats the process as necessary, i.e., repeats the process if the training condition has still not been met.

Figure 7B:
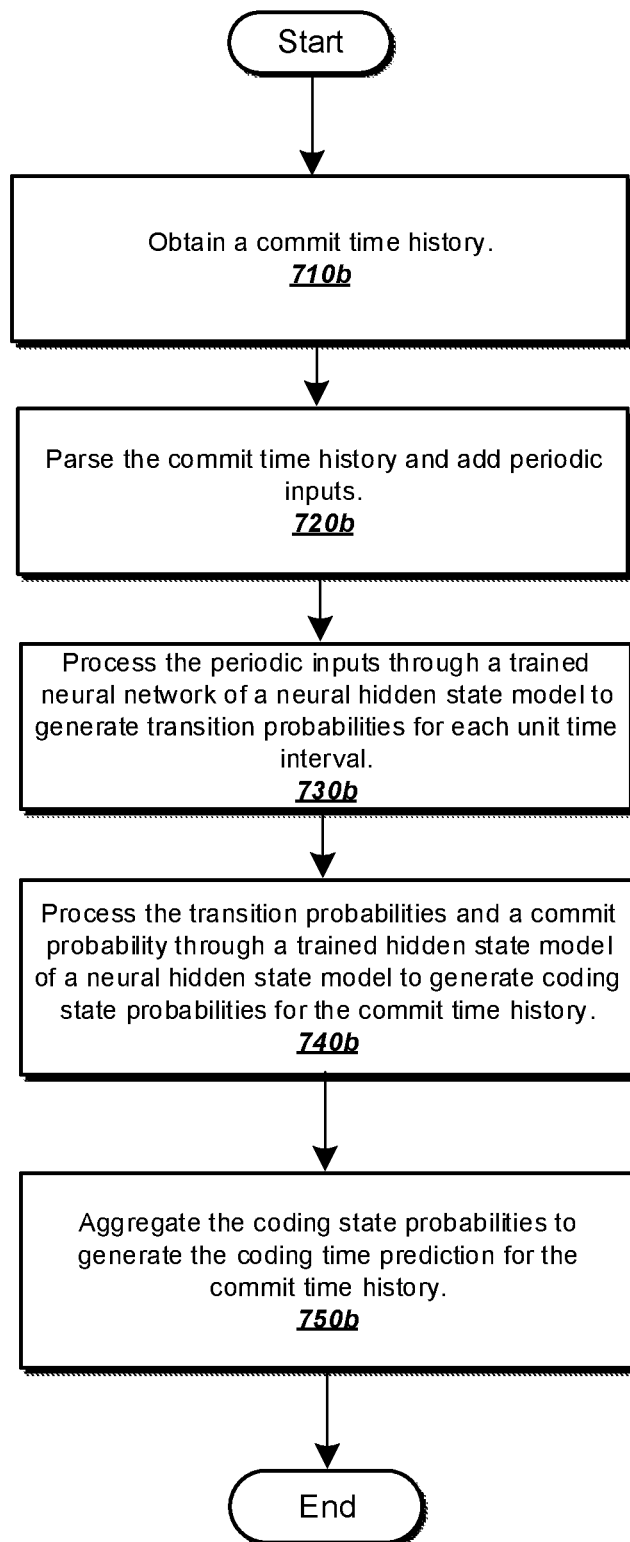
FIG. 7B is a flow chart of an example process of generating a coding time prediction for a commit time history.

FIG. 7B is a flow chart of an example process of generating a coding time prediction for a commit time history. For convenience, the example process will be described as being performed by a system of one or more computers, located in one or more locations, and programmed appropriately in accordance with this specification. For example, a source code analysis system, e.g., the source code analysis system 100 of FIG. 1, appropriately programmed, can perform the example process of FIG. 7B.

The source code analysis system obtains a commit time history (step 710*b*). As discussed above with respect to FIG. 1, the source code analysis system can obtain a commit time history from a version control system that generates a commit time history for a developer sending commits for a project stored on the code base repository and maintained by the version control system.

The source code analysis system parses the commit time history and adds periodic inputs (step 720*b*). As discussed above with respect to FIG. 2 and FIG. 3, the time interval engine can represent each unit time interval of a commit time history as coordinates on periodic graphs, e.g., a weekly periodic graph and a daily periodic graph.

The source code analysis system processes the periodic inputs through a trained neural network of a neural hidden state model to generate transition probabilities for each unit time interval (step 730*b*).

The source code analysis system can process the transition probabilities separate from the hidden state model, e.g., to assess typical working times or find the average duration of time the developer is coding during different parts of the day.

The source code analysis system processes the transition probabilities and a commit probability through a trained hidden state model of a neural hidden state model to generate coding state probabilities for the commit time history (step 740*b*).

The source code analysis system aggregates the coding state probabilities to generate the coding time prediction for the commit time history (step 750*b*). As described above with reference to FIG. 2, the source code analysis can aggregate the coding state probabilities using an aggregation engine. The aggregation engine can be configured to aggregate the coding state probabilities by adding the coding state probability for each unit time interval and multiplying by the length of the unit time interval, to generate the coding time prediction for the period of time spanned by the commit time history.

Figure 8:
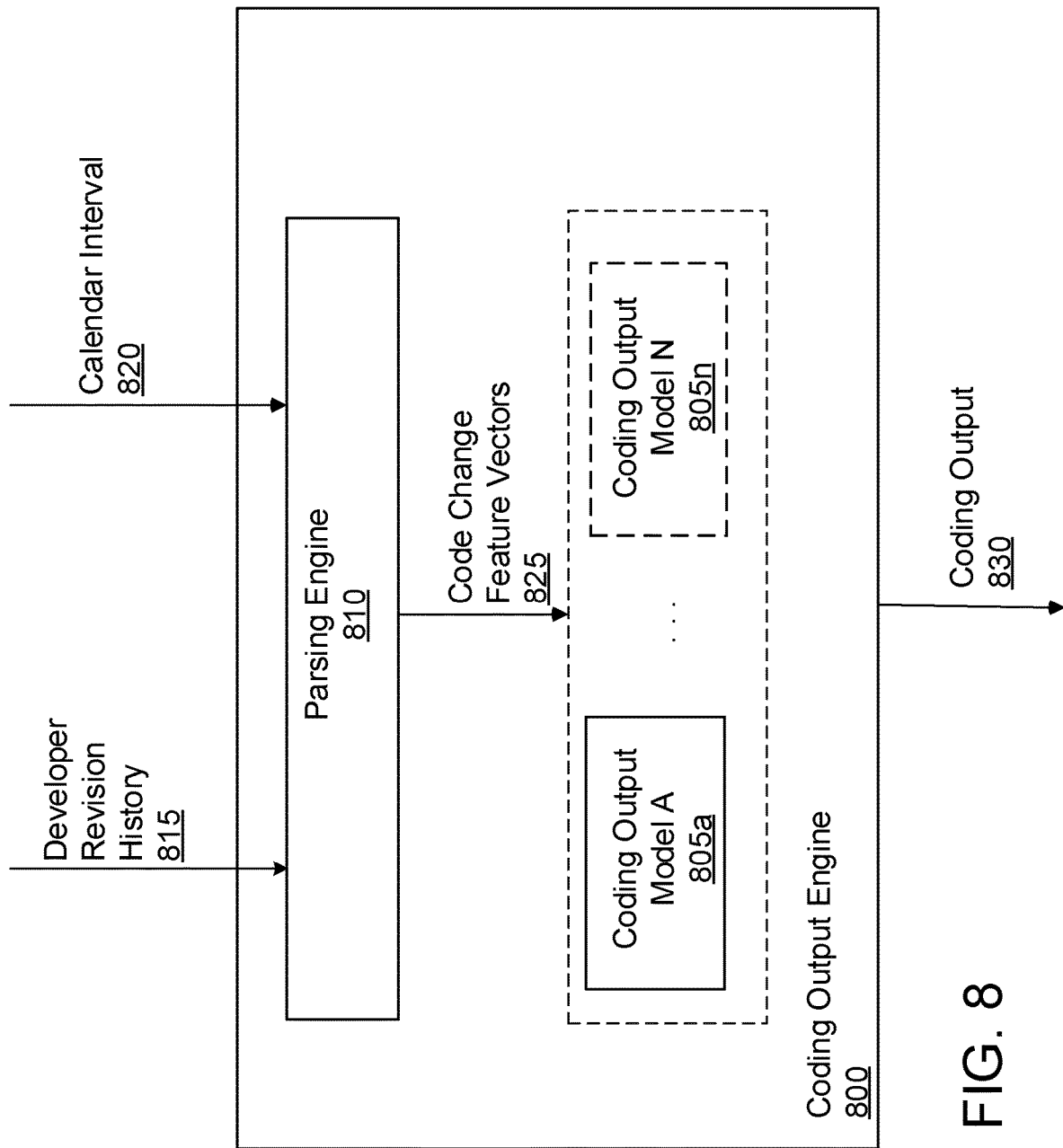
FIG. 8 illustrates an example coding output engine.

FIG. 8 illustrates an example coding output engine 800. The coding output engine 800 can include coding output models 805*a-n* and a parsing engine 810. The coding output engine 800 can receive, as input, a developer revision history 815 and a calendar interval 820, and generate, as output, a coding output 825.

The calendar interval 820 is a period of time to be analyzed by the coding output engine 800. The calendar interval 820 can represent, for example, a month or a week of time, but may also represent shorter intervals, such as a few hours or a single hour.

As discussed above, the developer revision history 815 can include the commit history for the developer, as well as additional information related to the developer, e.g., the developer's name or other identification. The developer revision history 815 can also include estimated or actual coding time for each commit interval in the commit history, e.g., for purposes of training or calibration. Coding time can be estimated, for example, by processing the developer's commit history through a coding time model trained to generate coding time predictions for that developer, as discussed above with respect to FIG. 1 and FIG. 2. Then, a coding time prediction engine can generate the estimated coding time for the developer to populate the developer revision history 815.

The coding output 830 can represent the amount of time a standard developer would take to make the source code changes represented in the developer revision history 815 during the calendar interval 820. The coding output 830 is a standard of comparison of a developer's work, and not a prediction of how long the developer actually took to complete the source code changes represented in a commit history for the developer.

Using the coding output 830, a developer can analyze their work or the other work of other developers against a generated coding output to make comparisons and identify areas of improvement. For example, the coding output engine 800 can identify a developer that spends less time than the standard developer on particular source code changes.

Accordingly, the coding output engine 800 can identify strengths or weaknesses in a developer's work efficiency, e.g., by automatically generating a report of the developer's efficient source code contributions, or by notifying the developer directly. A developer can also make changes to development workflow, e.g., by using a new integrated development environment, and the coding output engine 800 can compare coding output for source code changes committed in the old workflow and the new workflow. The coding output 830 can also be used to identify portions of a software project that would benefit most from refactoring, e.g., because the coding time for commits to that portion of the project is unusually high relative to the coding outputs for those same portions.

The coding output engine 800 can be configured to further process the coding output. In some implementations, the coding output engine 800 can compute a ratio between a coding output and the actual or predicted time a developer took to make a source code change. The coding output engine 800 can then use the ratio to compute a measure of coding efficiency. In some implementations, the coding output engine 800 can aggregate coding outputs over a period of time for a developer and generate an average coding output.

The coding output engine 800 can analyze coding output for one software project, multiple software projects, or portions of a software project. In some implementations, the coding output engine 800 can aggregate coding outputs over a portion of the software project to gather a profile of effort spent on the portion or, when combined with coding time, a profile of efficiency of each portion of the software project. For example, the coding output engine 800 can aggregate coding outputs for source code changes of different types. One type of source code change can be changes to code representing networking functionality of the software project, and another type of source code change can be changes to code representing a user interface for the software project.

Another type of source code change can be changes to code categorized by a particular design pattern, e.g., a software project designed with a Model-View-Controller scheme, with each source code change representing a change to one of those three components. In some implementations, the coding output engine 800 can aggregate coding outputs over the type of code change to distinguish types of code changes that require more or less effort based on the coding times for developers between commits for that type of code change. In this way, the coding output engine 800 can identify specific strong or weak points for a developer entity, which can be used in suggestions for improvement, e.g., subjects for individual training.

The coding output engine 800 can automatically rank collections of developers by a measure of efficiency. In some implementations, the coding output engine 800 can first generate a ratio between coding output and the predicted or actual coding time for each developer, and rank the developers by ratio. Alternatively or in addition, the coding output engine 800 can rank the developers by average coding output over all commits sent by each developer.

The parsing engine 810 can receive the developer revision history 815 and the calendar interval 820, and generate, as output, code change feature vectors 825. The code change feature vectors 825 can vary depending on the programming language of the source code changes represented in the developer revision history 815, corresponding to different features that are available in one programming language versus another. For ease of explanation, the code change feature vectors 825 will be discussed as a general input to the coding output models 805a-n, but the parsing engine 810 can generate programming-language-specific code change feature vectors, as input for a coding output model for that programming language, as appropriate.

The coding output engine 800 can maintain the coding output models 805a-n. The coding output engine 800 can train each coding output model 805a-n to generate the coding output 825 for a respective programming language, using the code change feature vectors 825 generated by the parsing engine 810.

The coding output engine 800 can use coding time estimations to train a coding output model to generate a coding output for source code changes to a software project written in any programming language for which the coding output engine 800 maintains a corresponding token dictionary, as discussed below. For example, the coding output engine 800 can train a coding output model A 805a to generate a coding output for source code changes to a software project written in the Python programming language. The coding output engine 800 can then also train a coding output model N 805n to generate a coding output for source code changes to a project written in the C programming language.

The relationship between source code change and coding time can be irreducibly noisy, e.g., due to unpredictable and frequent work interruptions, and/or due to skill differences between developers contributing to a project and random noise due to work interruption. In addition, the relationship between source code change and coding time may be best modeled as a multi-modal distribution, with similar types of source code changes corresponding to similar probability distributions for the length of coding time rather than similar actual values for the length of coding time. Therefore, each coding output model 805a-n can be implemented as a deep mixture density network, which mitigates noise by generating, as output, a mixed distribution of a plurality of distributions, for example normal distributions.

Before the coding output engine 800 can generate the coding output 825, the engine 800 can process the developer revision history 815 using the parsing engine 810 to generate a measure of comparing source code changes represented in the developer revision history 815. Source code changes can vary in the amount of time a developer requires to make those changes, e.g., because the changes appear across multiple source code files, or because the changes involving adding, deleting, or modifying many lines of source code.

Source code changes can be represented by rudimentary metrics, e.g., by a lines-of-code ("LOC") metric, but such metrics alone are often not rich enough to measure the extent of the source code change. Therefore, the parsing engine 810 can parse the developer revision history 815 to generate code change feature vectors 825 to accurately measure source code changes.

Moving to a discussion of each component of the coding output engine 800, the parsing engine 810 can identify the programming language of source code changes in the developer revision history 815. The parsing engine 810 can include a token dictionary for the identified programming language. The token dictionary can include keywords for the programming language, e.g., if, else, return, while, and class. The token dictionary can also include the top most frequent words used in the programming language, e.g., most commonly used variable names. The parsing engine 810 can track and update a histogram of the top words used in input developer revision histories, to update the token dictionary. The token dictionary can also include separators between words and keywords, e.g., such as the separators shown in TABLE 1.

TABLE 1

.
(
)
+
*

If the parsing engine 810 does not currently maintain a token dictionary for a particular programming language, the parsing engine 810 can obtain a pre-generated token dictionary. In some implementations, the token dictionary for a particular programming language is generated by analyzing a large representative set of source code written in the particular language, e.g., by empirical analysis, which the source code analysis system 100 can perform automatically. In some implementations, the token dictionary is generated at least partly by hand.

The parsing engine 810 can identify, from each commit represented in the developer revision history 815, the source code files of the software project modified—or "touched"—by the developer.

Next, the parsing engine 810 can identify differences introduced for each touched source code file. For each token, the parsing engine 810 can identify and track the differences between the lines modified by the commit. The parsing engine 810 can identify and track the differences using any appropriate technique, e.g., by using the Unix "diff" command with appropriate parameters, and storing values representing quantities of each identified token in a data structure, e.g., a vector. The parsing engine 810 can be configured to identify and track source code deletions in touched files as source code differences introduced by a commit.

The parsing engine 810 can identify and track differences before and after a source code file was touched by comparing trees that represent the file before and after the source code change. For example, the parsing engine 810 can generate abstract syntax trees representing a touched source code file before and after the source code change. Then, the parsing engine 810 can compute the difference between the trees, e.g., by processing the trees using any appropriate tree-diff algorithm. The parsing engine 810 can then convert the resulting tree-diff into a source code feature vector represented as a "bag-of-tree-edits," as discussed below.

Next, the parsing engine 810 can extract a number of features from a composite representing all of the differences in touched source code files. The features can describe the source code differences of a touched file in terms of the quantities of each token appearing in the file.

The parsing engine 810 can store features of a commit as a bag-of-words feature vector. The parsing engine can represent each modified line of source code, e.g., delimited by a new-line character or any appropriate separator for the programming language, as a composite string representing the tokens before and after modification to the modified line of source code, and generate the bag-of-words feature vector representing each token in the composite string, as well as a quantity for each token. In some implementations in which the parsing engine 810 is configured to compute a tree-diff, the parsing engine 810 represents the tree-diff between compared trees as a bag-of-tree-edits.

For example, if a line of source code is "print(a)" before a modification and "print(b)" after a modification, then the bag-of-words feature vector can be:

{"print": 2, "a": 1, "b": 1}

Alternatively or in addition, the parsing engine 810 can generate a composite string representing the differences for each touched source code file, and can generate a bag-of-words feature vector representing each token in the composite string, as well as a quantity for each token.

For example, a portion of a bag-of-words feature vector can be:

{"if": 3, "else": 2, "num": −1}

In this example, the bag-of-words vector represents that the "if" keyword and the "else" keyword were added three and two times, respectively, by the commit, while a word "num" (i.e., a variable name) was deleted in a source code file.

Alternatively, the parsing engine 810 can be configured to process a source code file and generate an n-dimensional embedding, e.g., using an appropriate trained machine learning model, and can compare the differences between embeddings of a source code file before and after a source code file was touched. An embedding can be a vector of features having fewer dimensions than a vector of features for each feature for a source code file. In some implementations, the parsing engine 810 can compare differences between embeddings of a source code file faster than comparing differences between features of a source code file by another representations.

The parsing engine 810 can be configured to use any appropriate metric from source code analysis performed by a source code analysis system, e.g., using metrics obtained from generating source code violation alerts, to extract features from a touched source code file.

As another example, the parsing engine 810 can also extract features generally related to a source code file or to a software project. For example, the parsing engine 810 can extract the number of lines of code modified for a source code file, or the number of touched source code files. Extracted features can also include differences before and after a source code file is touched, as measured by any appropriate source code analysis metric, e.g., differences in source code complexity, such as differences in cyclomatic complexity.

Next, the coding output engine 800 can obtain the coding time required to make the source code changes represented by each commit. The coding output engine 800 can use the coding time for each commit in training the coding output model for a particular programming language. As discussed above with reference to FIG. 2, the coding time prediction engine 200 can receive a commit time history 205 and output a coding time prediction 210.

The coding output engine 800 can then sample an estimated coding time from the coding time prediction 210 for each commit interval in the commit time history 205. In some implementations, the coding output engine 800 can estimate a coding time as an average expected coding time, e.g., by calculating the area under a graph representing the coding time prediction generated by the coding time prediction engine 200, as discussed with reference to FIG. 6.

If the coding time for each commit interval is available, e.g., because the developer accurately recorded time spent coding, generating estimated coding time is not necessary. In some implementations, code change feature vectors representing source code changes made by a developer during a short commit interval, e.g., 1 hour, are used to train the coding output model 800. In those implementations, each code change feature vector is labeled with a coding time that is the same or similar to the commit interval, motivated by the general observation that developers generally spend most, if not all, of their time coding during short commit intervals.

Figure 9:
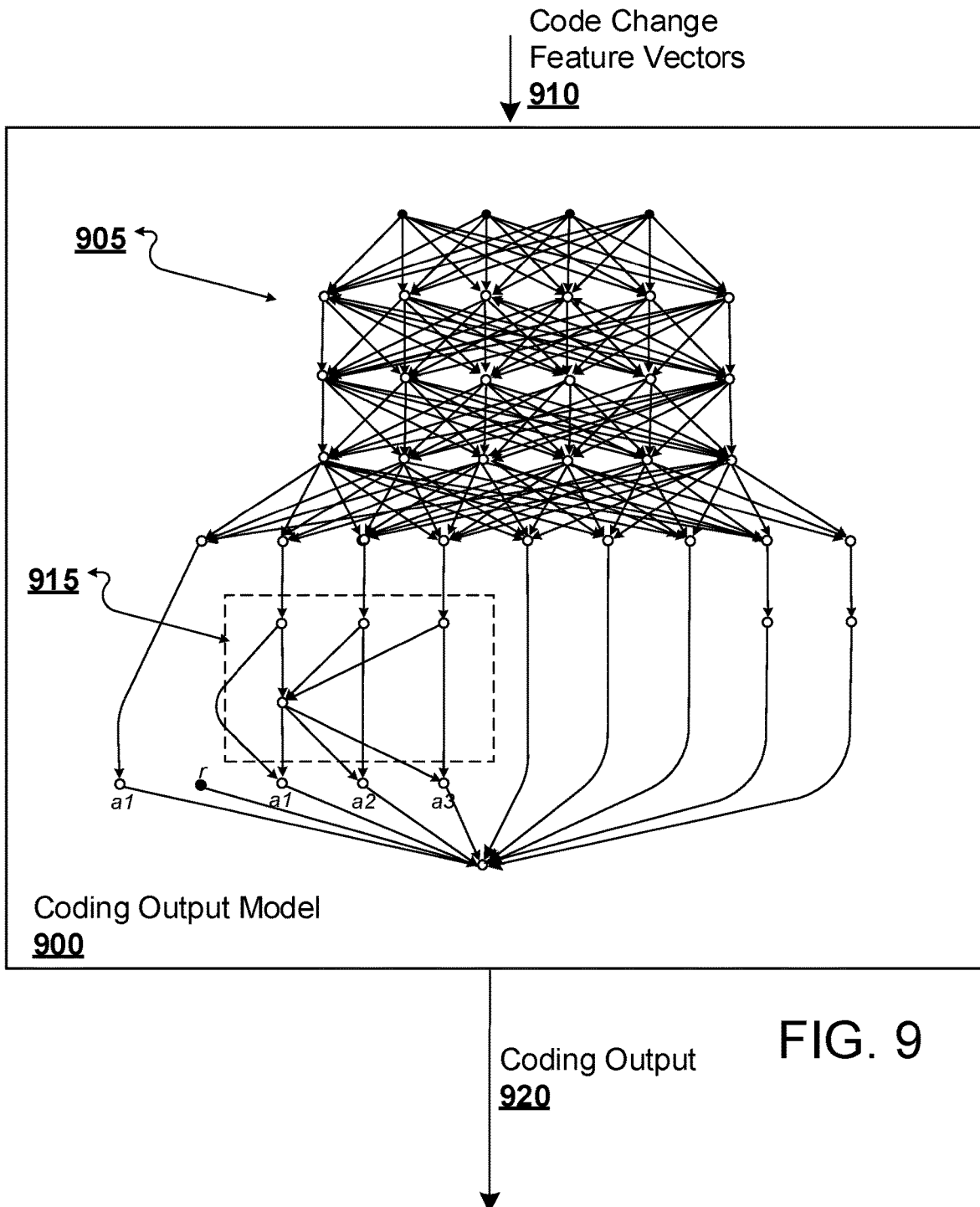
FIG. 9 illustrates an example coding output model.

FIG. 9 illustrates an example coding output model 900. The coding output model 900 can be modeled as a deep mixture density neural network 905, which for ease of reference will be referred to as a "mixture network." In general, a mixture network can have an input layer, an output layer, and a sequence of one or more hidden layers. Each layer of the mixture network can have one or more nodes that receive an input from a previous layer (or an outside input if the layer is the input layer), and generates an output activation using linear processing and a nonlinear activation function. The output activation can then either be an input for a node at the next layer in the sequence, or part of an overall output of the mixture network, if the output activation was generated by a node in the output layer.

The output for a mixture network is a mixture of distributions, represented as a tuple of mixture coefficients and parameters for each of the component distributions of the mixture. For example, in the case of a mixture of ten normal distributions, the output for the mixture network includes a tuple of ten mixture coefficients, ten means, and ten standard distributions. The weights can be further processed through a normalization layer 915 that can receive the weights, as input, and map each mixture coefficient to a normalized value in the interval (0, 1). In some implementations, the normalization layer 915 applies the softmax function for each mixture coefficient to ensure that each coefficient is positive and that they sum to 1.

The mixture network 905 can be configured to have any appropriate number of hidden layers and nodes at each layer, e.g., three hidden layers each having twenty-eight nodes. In addition, the mixture network 905 can be configured to receive, as input, code change feature vectors 910 generated by a parsing engine in the coding output engine.

The mixture network 905 can learn a set of weights for each layer to generate a mixture distribution of a plurality of normal distributions truncated at 0. The mixture of distributions is represented by: a set M representing the mean k, for each distribution k, a set $\Sigma$ representing the standard deviation $\sigma_k$ for each distribution k, and a set A of mixture coefficients representing the degree of mixture $\alpha_k$ of each distribution k. The mixture network 905 can generate a mixture distribution from any appropriate number of individual normal distributions, e.g., ten distributions.

The mixture network 905 can be trained to generate a mixed distribution representing distribution of coding times that correspond to similar kinds of code changes. By using a mixture network, the coding output model 900 can learn an accurate multi-modal distribution of coding times.

A coding output engine can train the coding output model 900 on a plurality of training examples, e.g., code change feature vectors 910. Each training example $\theta_i$ can be a code change feature vector representing a code change, labeled with an actual or estimated coding time that a developer took to make that code change.

Then, the coding output engine can train the coding output model 900 by any appropriate supervised learning technique, e.g., by backpropagation of the mixture network 905 to reduce a loss function. The loss function can be a likelihood function that generates, as output, the probability of the mixed distribution predicted by running the mixture network on the training example to assume the value of the observed coding time. Mathematically, this can be represented as $P(\theta|\alpha(\theta), M(\theta), \Sigma(\theta))$. In some implementations, the loss function is a logarithmic transformation of the likelihood function, i.e., a log-likelihood function.

After backpropagation, the coding output engine can update the weights of the coding output model 900 based on the calculated gradient at each layer. The coding output engine can train the coding output model 900 until meeting a predetermined condition. In some implementations, the coding output engine stops training the coding output model 900 after iterating training steps for the coding output model 900 a predetermined number of times. In some implementations, the coding output engine stops training the coding output model 900 when differences between iterations of computed loss values fall below a predetermined threshold.

Figure 10:
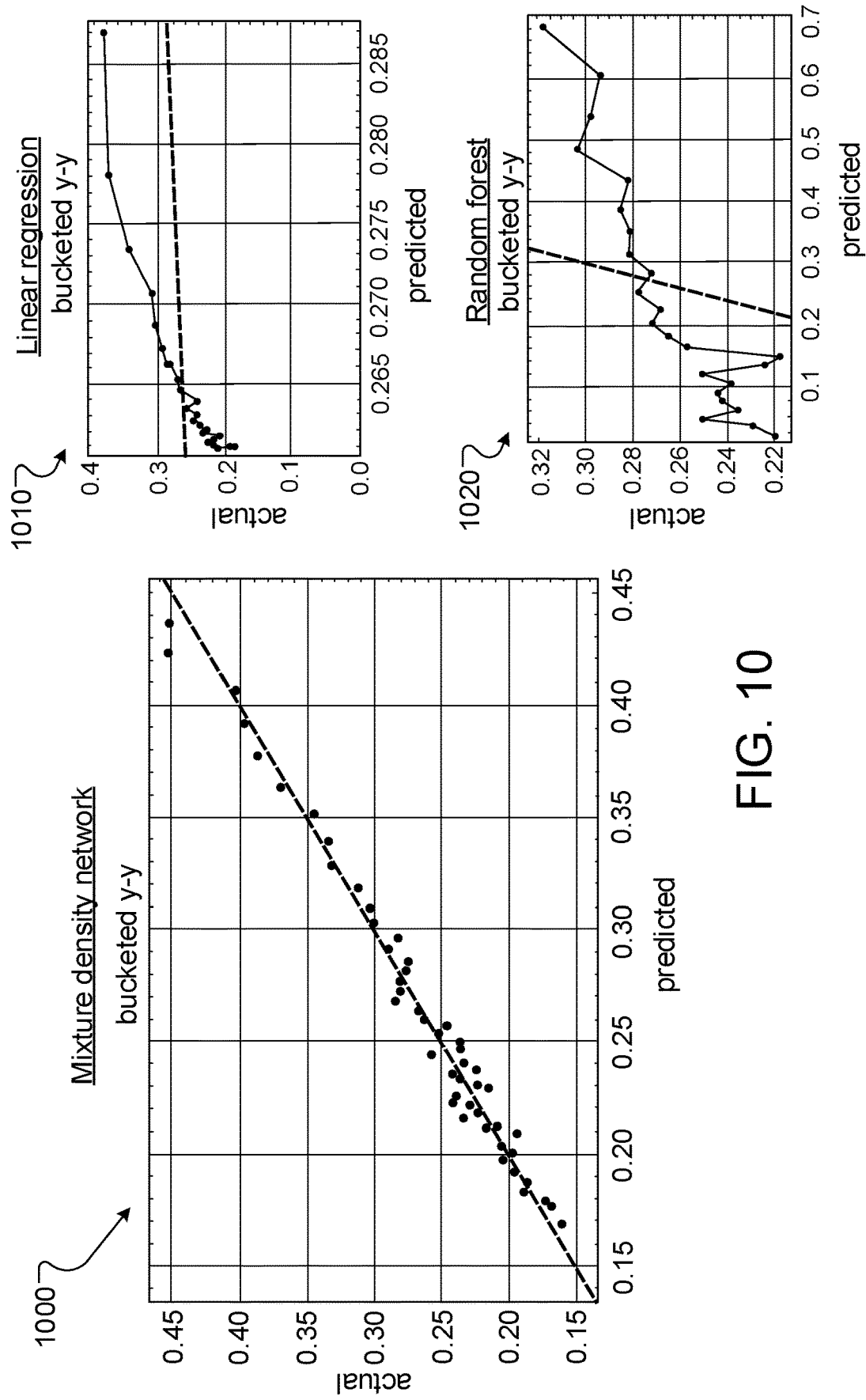
FIG. 10 illustrates graphs for actual vs. predicted coding outputs for a mixture network, a linear regression model, and a random forest model trained on the same data.

FIG. 10 illustrates graphs for actual vs. predicted coding outputs for a mixture network 1000, a linear regression model 1005, and a random forest model 1010 trained on the same data. The x-axis of each graph represents predicted coding outputs, while the y-axis of each graph represents the mean of actual coding times. Each coding output model represented in FIG. 10 was trained on approximately 350,000 training examples of source code changes in Python. Each data point on each graph represents an average predicted coding output for a respective bin of similar code changes not represented in the training examples. Each bin represents approximately 4800 training examples. The dotted line in each graph represents the values where actual coding time and the predicted coding output representing the coding time for the standard developer are the same. Based on the graphs, the mixture network generated coding outputs that were very close to the actual coding times for each code change, in contrast to the linear regression and random forest models.

Figure 11:
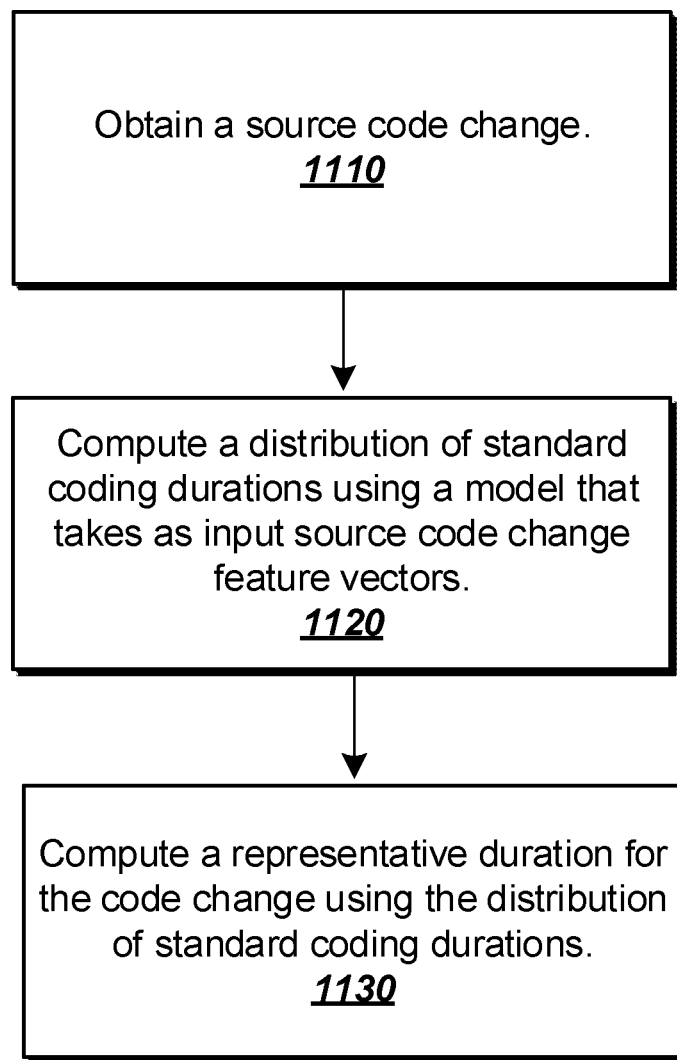
FIG. 11 is a flow chart of an example processing for generating a coding output for a standard developer.

FIG. 11 is a flow chart of an example processing for generating a coding output for a standard developer. For convenience, the example process will be described as being performed by a system of one or more computers, located in one or more locations, and programmed appropriately in accordance with this specification. For example, a source code analysis system, e.g., the source code analysis system 100 of FIG. 1, appropriately programmed, can perform the example process of FIG. 11.

The source code analysis system obtains a source code change (step 1110). As discussed above with reference to FIG. 1, the source code analysis system can include a coding output engine that can receive a developer revision history for one or more developers. Each developer revision history can include source code changes represented as commits to a software project, and the coding output engine can generate, for each source code change and programming language, a source code change feature vector using a parsing engine.

The source code analysis system computes a distribution of coding durations using a model that takes as input source code change feature vectors (step 1120). As discussed above with reference to FIG. 8, the coding output engine can maintain a plurality of coding output models, with each model configured to generate a distribution of coding durations for a respective programming language.

The source code analysis system computes a representative duration for the code change using the distribution of expected coding durations, wherein the representative duration represents a measure of how long a standard developer defined by the model would take to make the code change (step 1130). As discussed above with reference to FIG. 9, the coding output model can implement a mixture network to generate a mixture distribution. The mixture distribution describes the time random developers from the reference population might take to effect the specific code change. The source code analysis system can maintain, at the coding output engine, a different coding output model for multiple programming languages.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method comprising: obtaining a commit time history of a developer entity, wherein the commit time history indicates, for each unit time interval of a plurality of unit time intervals, whether or not the developer entity committed source code during the unit time interval; and generating a model that takes the commit history as input and generates an output sequence of final probabilities, each final probability representing how likely it was that the developer entity was active during the corresponding unit time interval.

Embodiment 2 is the method of embodiment 1, wherein the model is a neural hidden state model and generating the model comprises training the neural hidden state model using the commit history of the developer entity, the neural hidden state model comprising: a time component that converts each unit time interval into a plurality of periodic inputs of different period lengths, a neural network that takes the plurality of periodic inputs as well as normed overall time and generates for each time interval (i) a first parameter S representing a likelihood that the developer entity will start coding activity in the time interval if currently inactive, and (ii) a second parameter E representing a probability that the developer entity will end coding activity in the unit time interval if currently active, and a state transition model having an active state and an inactive state for each time interval, wherein the state transition model takes as input S, E, and a third parameter C representing a probability that the developer entity will commit source code if in the active state, and wherein the state transition model generates a final probability that the developer entity is active in each unit time interval.

Embodiment 3 is the method of any one of embodiments 1 through 2, further comprising: accepting a sequence of commits; and computing a logarithmic probability of the sequence conditioned on the input parameters C, S and E, without generating a sequence of final probabilities.

Embodiment 4 is the method of any one of embodiments 1 through 3, wherein training the neural hidden state model comprises using gradient descent with momentum optimizing the logarithmic probability to train C and the weights of the neural network.

Embodiment 5 is the method of any one of embodiments 1 through 4, further comprising: receiving a request to compute a coding time prediction in a particular time period, the coding time prediction representing how much time the developer entity spent coding in the time period based on the model; computing, for each time interval belonging to the particular time period, a respective final probability that the developer entity is active in the unit time interval; and aggregating the computed final probabilities for the developer entity to generate the coding time prediction.

Embodiment 6 is the method of any one of embodiments 1 through 5, wherein aggregating the computed final probabilities comprises computing an area under a curve defined by the sequence of computed final probabilities for unit time intervals within the particular time period.

Embodiment 7 is the method of any one of embodiments 1 through 6, further comprising assigning a final probability of 1 for each unit time interval in which the developer entity committed source code.

Embodiment 8 is the method of any one of embodiments 1 through 7, wherein the plurality of periodic inputs are two or more of a day, a week, a month, or a year.

Embodiment 9 is the method of any one of embodiments 1 through 8, wherein each periodic input comprises multiple dimensions.

Embodiment 10 is the method of any one of embodiments 1 through 9, wherein the multiple dimensions of each periodic input comprises a sine and cosine of an angle of a dial of a clock face of a clock having a dial that performs one rotation per period.

Embodiment 11 is the method of any one of embodiments 1 through 10, wherein the plurality of unit time intervals comprise one or more seconds, one or more minutes, or one or more hours.

Embodiment 12 is the method of any one of embodiments 1 through 11, wherein generating the model comprises training a neural hidden state model including partitioning the commit time history of the developer entity into multiple partitions such that breaks only occur at unit time intervals with commits and using each partition of the multiple partitions as a separate tensor slice for training the neural network.

Embodiment 13 is the method of any one of embodiments 1 through 12, further comprising generating a distinct model for each developer entity of a plurality of developer entities.

Embodiment 14 is the method of any one of embodiments 1 through 13, further comprising: receiving a request from a developer entity for coding state predictions for the developer entity over a particular time period represented as multiple unit time intervals; computing, for each unit time interval of the multiple unit time intervals, a respective state following an estimated shared posterior distribution, wherein the respective state for each unit time interval is either coding or not coding; aggregating the computed states to generate a sample from a coding time distribution for the developer entity; and in response to the request, sending the sample to the developer entity.

Embodiment 15 is the method of any one of embodiments 1 through 14, further comprising: receiving a coding time duration; generating, from the coding time duration, a probability density representing how likely it is that the developer entity was active for a period of time equal to the coding time duration following a previous commit represented in the commit time history.

Embodiment 16 is the method of any one of embodiments 1 through 15, wherein generating the probability density comprises: estimating the probability density from a plurality of simulated coding states, including, computing a frequency of coding states having a same state for the coding time duration.

Embodiment 17 is a method, the method comprising: receiving a source code change; computing a distribution of standard coding durations using a model that takes as input features of source code changes; and computing a representative duration for the code change using the distribution of standard coding durations, wherein the representative duration represents a measure of how long a standard developer defined by the model would take to make the code change.

Embodiment 18 is the method of embodiment 17 and further comprising the methods of any one of embodiments 1 through 16.

Embodiment 19 is the method of any one of embodiments 1 through 18, wherein the standard developer is representative of a population of developer entities.

Embodiment 20 is the method of any one of embodiments 1 through 19, further comprising: obtaining a training dataset comprising a plurality of code changes committed by a plurality of respective developer entities; computing, for each code change, a developer-specific commit interval, wherein the commit interval is a measure of elapsed time since the same developer committed a previous commit; converting each developer-specific commit interval into a respective coding time using a trained developer-specific coding time model; computing a plurality of code change feature values for each code change; and using the computed feature values and computed coding time as training data to train the model that predicts a distribution of observed coding times given a plurality of code change feature values.

Embodiment 21 is the method of any one of embodiments 1 through 20, wherein computing a plurality of code change feature values for each code change comprises: generating a composite change string from each of one or more files affected by the code change; tokenizing the composite change string; and computing values for a bag-of-words feature vector representing a quantity of token turnover for the tokenized composite change string.

Embodiment 22 is the method of any one of embodiments 1 through 21, wherein the bag-of-words feature vector has one vector element for each of a plurality of separators, keywords, and frequent words.

Embodiment 23 is the method of any one of embodiments 1 through 22, wherein generating the composite change string comprises concatenating all inserted and deleted lines of code in the code change into the composite change string.

Embodiment 24 is the method of any one of embodiments 1 through 23, wherein the model is a deep mixture density network.

Embodiment 25 is the method of any one of embodiments 1 through 24, wherein the deep mixture density network predicts a distribution of durations.

Embodiment 26 is the method of any one of embodiments 1 through 25, further comprising: generating a different respective model for each of a plurality of programming languages.

Embodiment 27 is the method of any one of embodiments 1 through 26, further comprising: computing, for a single developer entity, a plurality of respective aggregate measures of efficiency for each of the plurality of programming languages.

Embodiment 28 is the method of any one of embodiments 1 through 27, wherein the method further comprises: obtaining a measure of clock time spent making the first code change; computing a measure of efficiency of the first code change by computing a ratio that compares the representative coding duration to the measure of clock time spent making the first code change.

Embodiment 29 is the method of any one of embodiments 1 through 28, further comprising: using a plurality of respective code changes for each of a plurality of developer entities to compute a representative measure of coding output for each developer entity; and ranking the developers according to the representative measure of coding output for each developer entity.

Embodiment 30 is the method of any one of embodiments 1 through 29, further comprising tracking an aggregate measure of efficiency over time for a developer entity, wherein the aggregate measure of efficiency over each time period represents an aggregate duration of one or more commits in the time period relative to the length of the time period.

Embodiment 31 is the method of any one of embodiments 1 through 30, further comprising: training a predictive model to represent a measuring standard over a population of inputs; receiving a first input; and using the predictive model to generate a value that represents a quantity of units of the measuring standard for the first input.

Embodiment 32 is a system comprising one or more computers and one or more storage devices storing instructions that are operable, when executed by the one or more computers, to cause the one or more computers to perform the method of any one of embodiments 1 embodiments 31.

Embodiment 33 is one or more computer storage media encoded with a computer program, the program comprising instructions that are operable, when executed by data processing apparatus, to cause the data processing apparatus to perform the method of any one of embodiments 1 through 31.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
one or more computers and one or more storage devices storing instructions that are operable, when executed by the one or more computers, to cause the one or more computers to perform operations comprising:
obtaining a commit time history of a developer entity, wherein the commit time history indicates, for each unit time interval of a plurality of unit time intervals, whether or not the developer entity committed source code during the unit time interval; and
generating a model that takes the commit history as input and generates an output sequence of final probabilities, each final probability representing how likely it was that the developer entity was active during the corresponding unit time interval.

2. The system of claim 1, wherein the model is a neural hidden state model and generating the model comprises training the neural hidden state model using the commit history of the developer entity, the neural hidden state model comprising:
a time component that converts each unit time interval into a plurality of periodic inputs of different period lengths,
a neural network that takes the plurality of periodic inputs as well as normed overall time and generates for each time interval (i) a first parameter S representing a likelihood that the developer entity will start coding activity in the time interval if currently inactive, and (ii) a second parameter E representing a probability that the developer entity will end coding activity in the unit time interval if currently active, and
a state transition model having an active state and an inactive state for each time interval, wherein the state transition model takes as input S, E, and a third parameter C representing a probability that the developer entity will commit source code if in the active state, and wherein the state transition model generates a final probability that the developer entity is active in each unit time interval.

3. The system of claim 2, wherein the operations further comprise:
accepting a sequence of commits; and
computing a logarithmic probability of the sequence conditioned on the input parameters C, S and E, without generating a sequence of final probabilities.

4. The system of claim 2, wherein training the neural hidden state model comprises using gradient descent with momentum optimizing the logarithmic probability to train C and the weights of the neural network.

5. The system of claim 1, wherein the operations further comprise:
receiving a request to compute a coding time prediction in a particular time period, the coding time prediction representing how much time the developer entity spent coding in the time period based on the model;
computing, for each time interval belonging to the particular time period, a respective final probability that the developer entity is active in the unit time interval; and
aggregating the computed final probabilities for the developer entity to generate the coding time prediction.

6. The system of claim 5, wherein aggregating the computed final probabilities comprises computing an area under a curve defined by the sequence of computed final probabilities for unit time intervals within the particular time period.

7. The system of claim 1, wherein the operations further comprise assigning a final probability of 1 for each unit time interval in which the developer entity committed source code.

8. The system of claim 1, wherein the plurality of periodic inputs are two or more of a day, a week, a month, or a year.

9. The system of claim 2, wherein each periodic input comprises multiple dimensions.

10. The system of claim 9, wherein the multiple dimensions of each periodic input comprises a sine and cosine of an angle of a dial of a clock face of a clock having a dial that performs one rotation per period.

11. The system of claim 1, wherein the plurality of unit time intervals comprise one or more seconds, one or more minutes, or one or more hours.

12. The system of claim 1, wherein generating the model comprises training a neural hidden state model including partitioning the commit time history of the developer entity into multiple partitions such that breaks only occur at unit time intervals with commits and using each partition of the multiple partitions as a separate tensor slice for training the neural network.

13. The system of claim 1, wherein the operations further comprise generating a distinct model for each developer entity of a plurality of developer entities.

14. The system of claim 1, wherein the operations further comprise:
receiving a request from a developer entity for coding state predictions for the developer entity over a particular time period represented as multiple unit time intervals;
computing, for each unit time interval of the multiple unit time intervals, a respective state following an estimated shared posterior distribution, wherein the respective state for each unit time interval is either coding or not coding;

aggregating the computed states to generate a sample from a coding time distribution for the developer entity; and in response to the request, sending the sample to the developer entity.

15. The system of claim 14, wherein the operations further comprise:

receiving a coding time duration;

generating, from the coding time duration, a probability density representing how likely it is that the developer entity was active for a period of time equal to the coding time duration following a previous commit represented in the commit time history.

16. The system of claim 15, wherein generating the probability density comprises:

estimating the probability density from a plurality of simulated coding states, including, computing a frequency of coding states having a same state for the coding time duration.

17. A method comprising:

obtaining a commit time history of a developer entity, wherein the commit time history indicates, for each unit time interval of a plurality of unit time intervals, whether or not the developer entity committed source code during the unit time interval; and generating a model that takes the commit history as input and generates an output sequence of final probabilities, each final probability representing how likely it was that the developer entity was active during the corresponding unit time interval.

18. The method of claim 17, wherein the model is a neural hidden state model and generating the model comprises training the neural hidden state model using the commit history of the developer entity, the neural hidden state model comprising:

a time component that converts each unit time interval into a plurality of periodic inputs of different period lengths, a neural network that takes the plurality of periodic inputs as well as normed overall time and generates for each time interval (i) a first parameter S representing a likelihood that the developer entity will start coding activity in the time interval if currently inactive, and (ii) a second parameter E representing a probability that the developer entity will end coding activity in the unit time interval if currently active, and a state transition model having an active state and an inactive state for each time interval, wherein the state transition model takes as input S, E, and a third parameter C representing a probability that the developer entity will commit source code if in the active state, and wherein the state transition model generates a final probability that the developer entity is active in each unit time interval.

19. The method of claim 18, further comprising:

accepting a sequence of commits; and computing a logarithmic probability of the sequence conditioned on the input parameters C, S and E, without generating a sequence of final probabilities.

20. One or more computer-readable hardware storage devices encoded with instructions that, when executed by one or more computers, cause the one or more computers to perform operations comprising:

obtaining a commit time history of a developer entity, wherein the commit time history indicates, for each unit time interval of a plurality of unit time intervals, whether or not the developer entity committed source code during the unit time interval; and generating a model that takes the commit history as input and generates an output sequence of final probabilities, each final probability representing how likely it was that the developer entity was active during the corresponding unit time interval.

* * * * *